US008188996B2

(12) United States Patent
Dammertz et al.

(10) Patent No.: US 8,188,996 B2
(45) Date of Patent: *May 29, 2012

(54) SHALLOW BOUNDING VOLUME HIERARCHIES FOR ACCELERATED RAY TRACING

(75) Inventors: Holger Dammertz, Berlin (DE); Alexander Keller, Berlin (DE)

(73) Assignee: Mental Images GmbH, Berlin (DE)

( * ) Notice: Subject to any disclaimer, the term of this patent is extended or adjusted under 35 U.S.C. 154(b) by 675 days.

This patent is subject to a terminal disclaimer.

(21) Appl. No.: 12/271,509

(22) Filed: Nov. 14, 2008

(65) Prior Publication Data

US 2009/0189898 A1 Jul. 30, 2009

Related U.S. Application Data

(63) Continuation-in-part of application No. 11/474,517, filed on Jun. 23, 2006, now Pat. No. 7,499,053, and a continuation-in-part of application No. 10/299,574, filed on Nov. 19, 2002, now Pat. No. 7,184,042, which is a continuation-in-part of application No. 09/884,861, filed on Jun. 19, 2001, now Pat. No. 7,227,547.

(60) Provisional application No. 60/988,337, filed on Nov. 15, 2007, provisional application No. 61/112,529, filed on Nov. 7, 2008, provisional application No. 60/693,231, filed on Jun. 23, 2005, provisional application No. 60/265,934, filed on Feb. 1, 2001, provisional application No. 60/212,286, filed on Jun. 19, 2000.

(51) Int. Cl.
*G06T 15/00* (2011.01)

(52) U.S. Cl. ........................... 345/419; 345/426
(58) Field of Classification Search .................. 345/419, 345/426

See application file for complete search history.

(56) References Cited

U.S. PATENT DOCUMENTS

| | | | |
|---|---|---|---|
| 5,305,430 A | 4/1994 | Glassner | |
| 5,847,711 A | 12/1998 | Kaufman | |
| 6,028,606 A | 2/2000 | Kolb | |
| 6,172,679 B1 | 1/2001 | Lim | |
| 6,529,193 B1 | 3/2003 | Herken | |
| 6,597,359 B1 * | 7/2003 | Lathrop | 345/440 |
| 6,825,839 B2 | 11/2004 | Huang | |
| 6,862,026 B2 | 3/2005 | Zachmann | |
| 2003/0034968 A1 | 2/2003 | Abramov | |
| 2003/0052874 A1 | 3/2003 | Abramov | |
| 2004/0051783 A1 | 3/2004 | Chellappa | |
| 2004/0125103 A1 | 7/2004 | Kaufman | |

OTHER PUBLICATIONS

Christensen, Per H., Julian Fong, David M. Laur, and Dana Batali. "Ray Tracing for the Movie 'Cars'" IEEE Symposium on Interactive Ray Tracing (Sep. 2006): 1-6.*
Cline, David, Kevin Steele, and Parris Egbert. "Lightweight Bounding Volumes for Ray Tracing." Journal of Graphics Tools: JGT (2006): 1-9.*

(Continued)

*Primary Examiner* — Xiao M. Wu
*Assistant Examiner* — Scott E Sonners
(74) *Attorney, Agent, or Firm* — Jacobs & Kim LLP; David Jacobs

(57) ABSTRACT

Methods, systems, devices, and computer program code (software) products enable acceleration of ray tracing by using acceleration data structures with high arity to enable processing of nodes using streaming SIMD (Single Instruction, Multiple Data) instructions with reduced memory requirements.

29 Claims, 27 Drawing Sheets

OTHER PUBLICATIONS

Reshetov, Alexander, Alexei Soupikov, and Jim Hurley. "Multi-level Ray Tracing Algorithm." ACM Transactions on Graphics 24.3 (2005): 1176-185.*

Smits, Brian. "Efficiency Issues for Ray Tracing." Journal of Graphics Tools 3 (1999): 1-14.*

Wald, Ingo, Christiaan Gribble, Solomon Boulos, and Andrew Kensler. "SIMD Ray Stream Tracing—SIMD Ray Traversal with Generalized Ray Packets and On-The-Fly Re-Ordering." SCI Institute, University of Utah, Technical Report #UUSCI-2007-012 (Aug. 2007): 1-8.*

Benthin, Realtime Ray Tracing on Current CPU Architectures, Ph.D. Thesis, Saarland University (2006).

Christensen, Ray Tracing for the Movie Cars, Proc. 2006 IEEE/EG Symposium on Interactive Ray Tracing, pp. 1-6 (2006).

Ernst, Early Split Clipping for Bounding Volume Hierarchies, Proc. 2007 IEEE/EG Symposium on Interactive Ray Tracing, pp. 73-78 (2007).

Glassner, Introduction to Ray Tracing, Academic Press (1989).

Reshetov, Faster Ray Packets-Triangle Intersection, Proc. 2007 IEEE/EG Symposium on Interactive Ray Tracing, pp. 105-112 (2007).

Reshetov, Multi-Level Ray Tracing Algorithm ACM Transactions on Graphics, Proc. SIGGRAPH 2005, 24(3):1176-1185 (2005).

Shirley, Realistic Ray Tracing, AK Peters, Ltd. (2000).

Veach, Robust Monte Carlo Methods for Light Transport Simulation, Ph.D. Thesis, Stanford University (1997).

Waechter, Instant Ray Tracing: The Bounding Interval Hierarchy, Rendering Techniques 2006, Proc. 17th Eurographics Sympos. on Rendering, pp. 139-149 (2006).

Waechter, Terminating Spatial Partition Hierarchies by A Priori Bounding Memory, Proc. 2007 IEEE Sympos. on Interactive Ray Tracing, pp. 41-46 (2007).

Wald, Fast Construction of SAH-Based Bounding Volume Hierarchies, Proc. of 2007 Eurographics Symposium on Interactive Ray Tracing (2007).

Wald, Realtime Ray Tracing and Interactive Global Illumination, Ph.D. Thesis, Saarland University (2004).

Wald, Interactive Rendering with Coherent Ray Tracing, Eurographics 2001, 20(3):153?164 (2001).

Wald, Ray Tracing Deformable Scenes Using Dynamic Bounding Volume Hierarchies, ACM Transactions on Graphics, 26(1) (2006).

Wald, State of the Art in Ray Tracing Animated Scenes, Eurographics 2007 State of the Art Reports (2007).

Keller, Strictly Deterministic Sampling Methods in Computer Graphics, 2001, http://graphics.uni-uml.de.

Keller, Instant Radiosity, Proc. of 24th Annual Conference on Computer Graphics and Interactive Techniques, 1997.

Morokoff, Quasi-Monte Carlo Integration, J. of Computational Physics, 1995.

Veach, Optimally Combining Sampling Techniques for Monte Carlo Rendering, Computer Graphics Proceedings, 1995.

Shirley, Monte Carlo Techniques for Direct Lighting Calculations, ACM Transactions on Graphics, 1996.

Benthin, Interactive ray tracing of free-form surfaces, Proceedings of Afrigraph, 2004, pp. 99-106.

Hurley, Fast ray tracing for modern general purpose CPU, Graphicon 2002.

Keller, Quasi-Monte Carlo Methods for Photorealistic Image Synthesis, Ph.D. thesis, Shaker Verlag Aachen, 1998.

Kay, Ray tracing complex scenes, Computer Graphics (Proceedings of SIGGRAPH 86), vol. 20, 1986, pp. 269-278.

MacDonald, Heuristics for ray tracing using space subdivision, The Visual Computer 6 (1990), No. 3.

Schmittler, Realtime Ray Tracing of Dynamic Scenes on an FPGA Chip, Proceedings of Graphics Hardware, 2004, pp. 95-106.

Whitted, Improved Illumination Model for Shaded Display, Communications of the ACM 23, 1980, No. 6, 343-349.

Wald, State of the art in interactive ray tracing, State of the Art Reports, Eurographics 2001, Eurographics, 2001, pp. 21-42.

Woop, RPU: A programmable ray processing unit for realtime ray tracing, SIGGRAPH 05 Conference Proceedings.

Gaede, Multidimensional Access Methods, ACM Computing Surveys, vol. 30, No. 2, 1998.

IBM Technical Disclosure Bulletin Quasi-Monte Carlo Rendering With Adaptive Sampling, vol. 39, No. 9, 1996, pp. 215-224.

Sung, Design and Implementation of the Maya Renderer, Computer Graphics and Applications, 1998.

Cook, Stochastic sampling in computer graphics, 1986, ACM Transactions on Graphics, vol. 5, Issue 1, p. 51-72.

Wong, Sampling with Hammersley and Halton Points, 1997, Journal of Graphics Tools, vol. 2, No. 2, pp. 9-24.

* cited by examiner

| scene | axes-based | distance-based |
|---|---|---|
| power plant | 799.6 | 810.9 |
| sponza atrium | 339.2 | 347.6 |
| conference | 219.1 | 224.2 |

FIG. 10

| Scene | MEM | ACC | ACT | TTI | RTT |
|---|---|---|---|---|---|
| Conf. (1M) | 32 MB | kd | 2.1s | 113.7s | 80.5s |
| | 23 MB | BIH | 1.4s | 139.3s | 104.7s |
| | 24 MB | ncQBVH | 1.5s | 95.7s | 63.6s |
| | 16 MB | QBVH | 1.2s | 85.0s | 53.8s |
| Interior (0.9M) | 27 MB | kd | 1.8s | 107.3s | 77.7s |
| | 21 MB | BIH | 1.4s | 131.1s | 101.4s |
| | 22 MB | ncQBVH | 1.5s | 85.5s | 56.3s |
| | 14 MB | QBVH | 1.1s | 81.1s | 52.0s |
| Plant (12M) | 392 MB | kd | 30.0s | 118.5s | 97.3s |
| | 206 MB | BIH | 21.5s | 143.6s | 112.4s |
| | 310 MB | ncQBVH | 23.9s | 104.1s | 78.0s |
| | 185 MB | QBVH | 19.1s | 94.7s | 56.1s |

FIG. 11

| Scene | ACC | inner nodes | leaves | tris/leaf | tris/ray | inner/ray | leaves/ray |
|---|---|---|---|---|---|---|---|
| Conf. (1M) | kd | 371018 | 38449 | 13.2 | 16.2 | 40.7 | 6.36 |
| | BIH | 1066634 | 557709 | 1.8 | 7.2 | 71.2 | 3.78 |
| | QBVH | 44704 | 133323 | 7.4 | 20.4 | 11.8 | 2.29 |
| Interior (0.9M) | kd | 429294 | 450133 | 9.0 | 20.6 | 50.0 | 4.89 |
| | BIH | 931393 | 510266 | 1.8 | 8.4 | 101.1 | 4.58 |
| | QBVH | 41569 | 123144 | 7.4 | 21.7 | 18.1 | 2.48 |
| Plant (12M) | kd | 4379594 | 4801842 | 14.9 | 29.0 | 59.1 | 4.28 |
| | BIH | 10923900 | 6717548 | 1.9 | 10.5 | 141.4 | 5.01 |
| | QBVH | 548908 | 1603848 | 7.9 | 32.6 | 24.5 | 2.93 |

FIG. 12

| Kernel | Sponza | Interior 1 | Interior 2 | Plant |
|---|---|---|---|---|
| 2x2 BIH | 16.3 | 16.6 | 10.9 | 3.6 |
| BIH | 6.4 | 6.6 | 4.1 | 1.4 |
| QBVH | 14.1 | 11.9 | 9.03 | 2.4 |

FIG. 13

Conference

| MEM | 16 MB | | | | 5 MB | | | |
|---|---|---|---|---|---|---|---|---|
| ACC | kd | BIH | ncQBVH | QBVH | kd | BIH | ncQBVH | QBVH |
| ACT | 1.3s | 1.2s | 1.2s | 1.2s | — | 0.7s | 0.7s | 0.7s |
| TTI | 119s | 138s | 99s | 85s | — | 220s | 224s | 120s |
| RTT | 89s | 106s | 86s | 54s | — | 189s | 190s | 91s |

Interior

| MEM | 16 MB | | | | 8 MB | | | |
|---|---|---|---|---|---|---|---|---|
| ACT | 1.3s | 1.2s | 1.1s | 1.1s | 0.8s | 0.9s | 0.9s | 0.9s |
| TTI | 113s | 130s | 91s | 81s | 250s | 139s | 118s | 88s |
| RTT | 84s | 101s | 63s | 56s | 219s | 110s | 90s | 59s |

Plant

| MEM | 185 MB | | | | 100 MB | | | |
|---|---|---|---|---|---|---|---|---|
| ACT | 21s | 18s | 19s | 19s | 14s | 15s | 16s | 16s |
| TTI | 129s | 139s | 105s | 95s | 369s | 145s | 117s | 95s |
| RTT | 85s | 98s | 78s | 56s | 330s | 107s | 90s | 68s |

FIG. 14

| Scene | 36 TTI | 36 MEM | VI TTI | VI MEM |
|---|---|---|---|---|
| Interior | 107s | 32 MB | 108s | 16 MB |
| Plant | 191s | 438 MB | 197s | 213 MB |
| Conference | 62s | 43 MB | 66s | 18 MB |

150

160

| Scene | N#BBox | NTTI | C#BBox | CTTI |
|---|---|---|---|---|
| Conference | 16.8 | 73s | 11.7 | 62s |
| Conference 2 | 20.7 | 92s | 9.9 | 60s |
| Interior | 17.3 | 109s | 15.4 | 107s |
| Plant | 44.8 | 297s | 25.0 | 191s |

170

| Scene | best | average | worst |
|---|---|---|---|
| Space Ship | 0.25 | 0.435 | 1.0 |
| Kitchen | 0.25 | 0.463 | 0.992 |
| Sponza (Frame 16) | 0.25 | 0.457 | 0.99 |

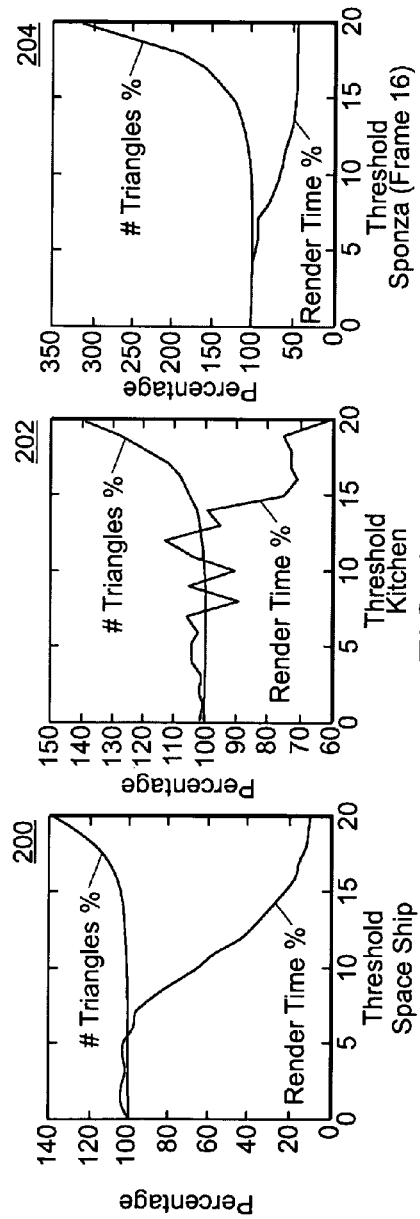
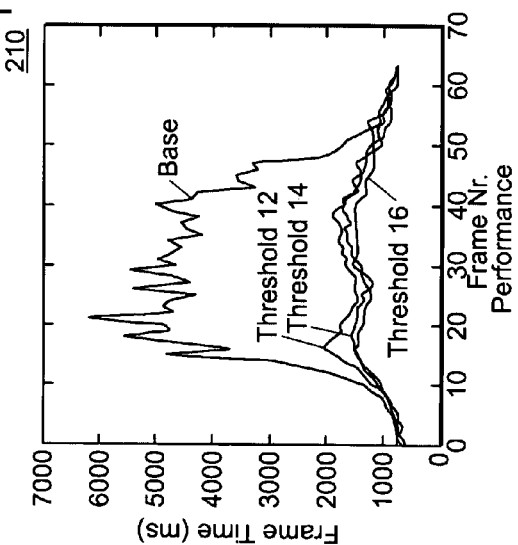
FIG. 20
FIG. 21

```
class SIMD_Node
{
public:
float Min[4 * 3];  // minimum components x0-x3, y0-y3, z0-z3
float Max[4 * 3];  // maximum components x0-x3, y0-y3, z0-z3
int Child[4];
char FatherAxis, LeftChildAxis, RightChildAxis;
char isBuild;
...
};
```

```
static inline __m128 intersectRayQBox(const QRay_t* ray,            230
                                       const SIMD_Node* const node)
{
    __m128 t0, t1;
    __m128 min = _mm_set1_ps(0.0f);
    __m128 max = ray->t4;

t0  = _mm_mul_ps(_mm_sub_ps(node->min[ray->dirSign[0]],
                                ray->o4.x), ray->id4.x);
    t1  = _mm_mul_ps(_mm_sub_ps(node->min[3-ray->dirSign[0]],
                                ray->o4.x), ray->id4.x);
    min = _mm_max_ps(min, t0); max = _mm_min_ps(max, t1);
    t0  = _mm_mul_ps(_mm_sub_ps(node->min[ray->dirSign[1]+1],
                                ray->o4.y), ray->id4.y);
    t1  = _mm_mul_ps(_mm_sub_ps(node->min[3-ray->dirSign[1]+1],
                                ray->o4.y), ray->id4.y);
    min = _mm_max_ps(min, t0); max = _mm_min_ps(max, t1);
    t0  = _mm_mul_ps(_mm_sub_ps(node->min[ray->dirSign[2]+2],
                                ray->o4.z), ray->id4.z);
    t1  = _mm_mul_ps(_mm_sub_ps(node->min[3-ray->dirSign[2]+2],
                                ray->o4.z), ray->id4.z);
    min = _mm_max_ps(min, t0); max = _mm_min_ps(max, t1);

return _mm_cmple_ps(min, max);
}
```

FIG. 23

```
                                                                    240 if(ray.dirSign[pNodes[tempQ].FatherAxis])
{
    if(ray.dirSign[pNodes[tempQ].LeftChildAxis])
    {
        if(boxResult.a.i[0])  {qStack[top++] = pNodes[tempQ].child[0];}
        if(boxResult.a.i[1])  {qStack[top++] = pNodes[tempQ].child[1];}
    }
    else
    {
        if(boxResult.a.i[1])  {qStack[top++] = pNodes[tempQ].child[1];}
        if(boxResult.a.i[0])  {qStack[top++] = pNodes[tempQ].child[0];}
    }
    if(ray.dirSign[pNodes[tempQ].RightChildAxis])
    {
        if(boxResult.a.i[2])  {qStack[top++] = pNodes[tempQ].child[2];}
        if(boxResult.a.i[3])  {qStack[top++] = pNodes[tempQ].child[3];}
    }
    else
    {
        if(boxResult.a.i[3])  {qStack[top++] = pNodes[tempQ].child[3];}
        if(boxResult.a.i[2])  {qStack[top++] = pNodes[tempQ].child[2];}
    }
}
else
{
```

FIG. 24

```
if(ray.dirSign[pNodes[tempQ].LeftChildAxis])
{
    if(boxResult.a.i[2]) {qStack[top++] = pNodes[tempQ].child[2];}
    if(boxResult.a.i[3]) {qStack[top++] = pNodes[tempQ].child[3];}
}
else
{
    if(boxResult.a.i[3]) {qStack[top++] = pNodes[tempQ].child[3];}
    if(boxResult.a.i[2]) {qStack[top++] = pNodes[tempQ].child[2];}
} if(ray.dirSign[pNodes[tempQ].RightChildAxis])
{
    if(boxResult.a.i[0]) {qStack[top++] = pNodes[tempQ].child[0];}
    if(boxResult.a.i[1]) {qStack[top++] = pNodes[tempQ].child[1];}
}
else
{
    if(boxResult.a.i[1]) {qStack[top++] = pNodes[tempQ].child[1];}
    if(boxResult.a.i[0]) {qStack[top++] = pNodes[tempQ].child[0];}
}
}
```

FIG. 24 CONT

```
do {                                                            250
int top = -1;
boxResult.a.v = intersectRayQBox(&ray,
        (SIMD_Node*)&pNodes[*entry]);

if (boxResult.a.i[0] && pNodes[*entry].child[0]
    && (visited != pNodes[*entry].child[0]))
    {qStack[++top] = pNodes[*entry].child[0];}
if (boxResult.a.i[1] && pNodes[*entry].child[1]
    && (visited != pNodes[*entry].child[1]))
    {qStack[++top] = pNodes[*entry].child[1];}
if (boxResult.a.i[2] && pNodes[*entry].child[2]
    && (visited != pNodes[*entry].child[2]))
    {qStack[++top] = pNodes[*entry].child[2];}
if (boxResult.a.i[3] && pNodes[*entry].child[3]
    && (visited != pNodes[*entry].child[3]))
    {qStack[++top] = pNodes[*entry].child[3];}
```

FIG. 25

```
while (top >= 0) {
int tempQ = qStack[top];
if (tempQ < 0) {
SIMD_intersectLeaf_Parent(f_pKernel, tempQ, tray, &returnEntry);
} else {
boxResult.a.v = intersectRayQBox(tray, (QBVH4NodesSIMD_t*)&pNodes[tempQ])
if (_mm_movemask_ps(boxResult.a.v) != 0) { // => small performance gain
if (boxResult.a.i[0]) {qStack[top++] = pNodes[tempQ].child[0];}
if (boxResult.a.i[1]) {qStack[top++] = pNodes[tempQ].child[1];}
if (boxResult.a.i[2]) {qStack[top++] = pNodes[tempQ].child[2];}
if (boxResult.a.i[3]) {qStack[top++] = pNodes[tempQ].child[3];}
} // end if _mm_movemask_ps
}
top--;
} visited = *entry;
*entry = pNodes[*entry].parent; // now, go up one step
} while (*entry >= 0);
```

FIG. 25 CONT

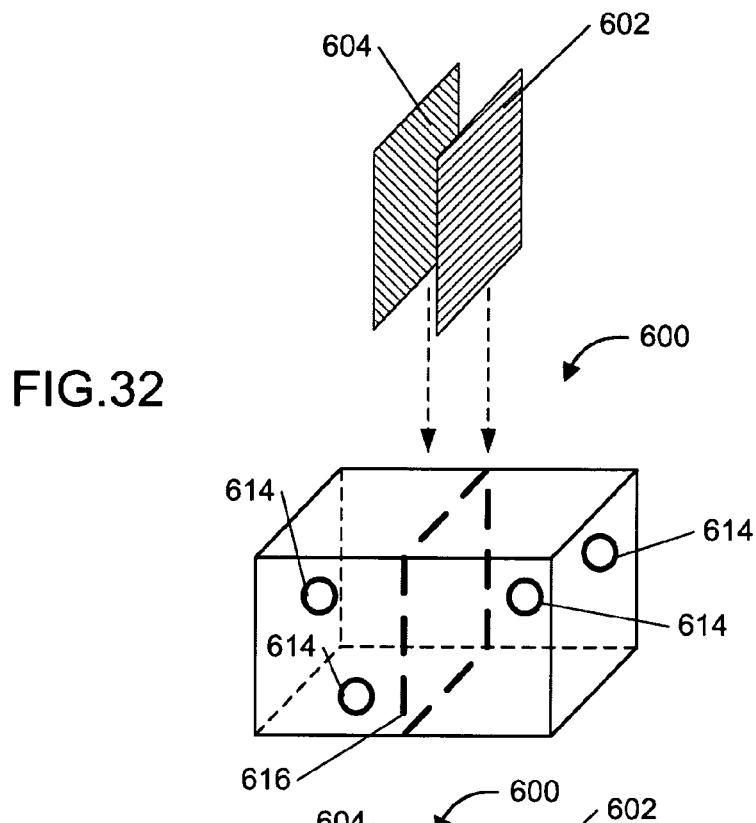
FIG. 32
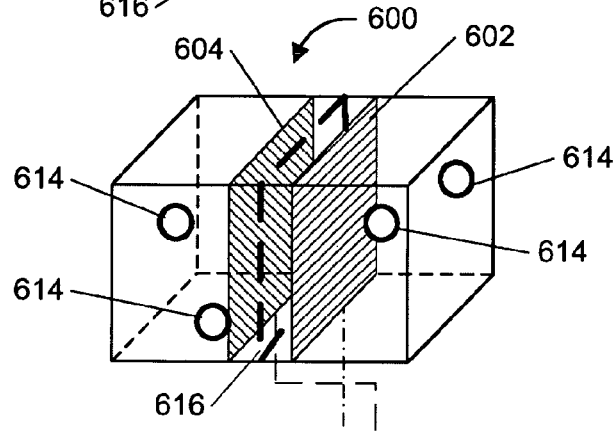
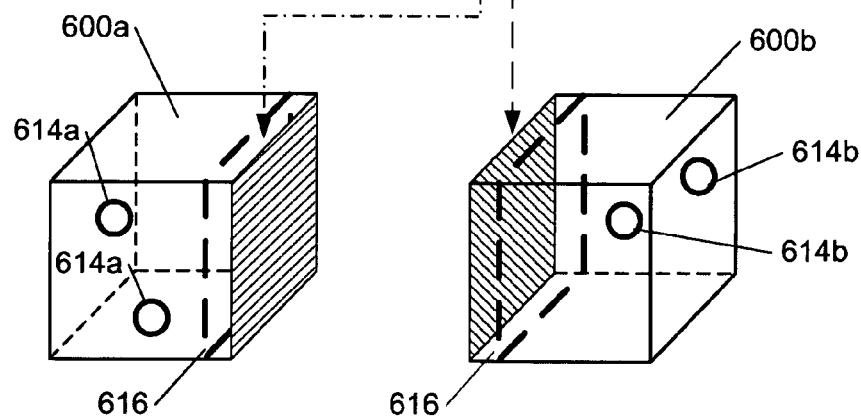
FIG. 33

1000

---

1001: MODULE TO SUBDIVIDE GEOMETRY OR BOUNDING BOXES IN A NUMERICALLY ROBUST WAY

1002: MODULE TO BUILD "CLASSIC" ACCELERATION DATA STRUCTURE FOR RAY TRACING FROM PREVIOUS (1001)

1003: MODULE TO OPTIONALLY/POTENTIALLY USE PRECOMPUTED PARTS OF A HIERARCHY TO SPEED UP THE PROCESS FOR ANIMATED GEOMETRY

1004: MODULE TO INCREASE ARITY OF DATA STRUCTURE BY MERGING SUBSEQUENT LEVELS OF THE HIERARCHY

1005: MODULE TO TRAVERSE NODES USING SIMD INSTRUCTIONS FOR EITHER RAYS OR PACKETS OF RAYS

FIG. 36

SHALLOW BOUNDING VOLUME HIERARCHIES FOR ACCELERATED RAY TRACING

CITATION TO RELATED APPLICATIONS

The present application is a Continuation-in-Part of U.S. patent application Ser. No. 11/474,517, and claims the priority benefit of U.S. Provisional Applications for Patent Ser. Nos. 60/988,337 and 61/112,529, each of which is incorporated herein by reference.

U.S. patent application Ser. No. 11/474,517, filed Jun. 23, 2006, claims the benefit of U.S. Provisional Patent App. Ser. No. 60/693,231 filed Jun. 23, 2005, and is also a Continuation-in-Part of U.S. patent application Ser. No. 10/299,574, filed Nov. 19, 2002.

U.S. patent app. Ser. No. 10/299.574 is a Continuation-in-Part of U.S. Ser. No. 09/884,861, filed Jun. 19, 2001, which claims priority benefit from U.S. Provisional Patent App. Ser. No. 60/265,934, filed Feb. 1, 2001, and 60/212,286 filed Jun. 19, 2000.

Each of the above-listed patent applications, as well as their provisional counterparts, is incorporated by reference herein in its entirety as if set forth in its entirety herein.

FIELD OF THE INVENTION

The present invention relates to systems, methods, devices, architectures, apparatus and computer software/program code products for computer graphics.

BACKGROUND OF THE INVENTION

Computer graphics systems and methods for synthesizing photorealistic images, i.e., images that cannot be distinguished from photographs, have a wide field of applications, among them being the animated movie industry and product visualization. Photorealistic image synthesis typically requires the simulation of global illumination, which can typically only be approximated in a consistent manner by using ray tracing.

Contrary to rasterization, ray tracing allows one to follow arbitrary transport paths of light. Algorithms that perform physically correct simulations of light transport tend to shoot rays as wide-spread as possible in order to increase efficiency. As a result, most rays that account for global illumination effects are incoherent.

Among examples of prior art approaches, the following are various documents, each of which is incorporated herein as if set forth herein in its entirety:

Benthin, C, "Realtime Ray Tracing on Current CPU Architectures," Ph.D. Thesis, Saarland University (2006).
Christensen, P., "Ray Tracing for the Movie Cars," Proc. 2006 IEEE/EG Symposium on Interactive Ray Tracing, pp. 1-6 (2006).
Emst, M, and Greiner, G., "Early Split Clipping for Bounding Volume Hierarchies," Proc. 2007 IEEE/EG Symposium on Interactive Ray Tracing, pp. 73-78 (2007).
Geimer, M, "interaktives Ray Tracing," Ph.D. Thesis, Koblenz-Landau University, Germany (2006).
Glassner, A., "An Introduction to Ray Tracing," Academic Press (1989).
Reshetov, A., "Faster Ray Packets—Triangle Intersection through Vertex Culling," Proc. 2007 IEEE/EG Symposium on Interactive Ray-Tracing, pp. 105-112 (2007).
Reshetov, A., Soupikov, A., and Hurley. J., "Multi-Level Ray Tracing Algorithm" ACM Transactions on Graphics, Proc. SIGGRAPH 2005, 24(3): 1176-1185 (2005).
Shirley, P, "Realistic Ray Tracing," A K Peters, Ltd. (2000).
Veach, E., "Robust Monte Carlo Methods for Light Transport Simulation," Ph.D. Thesis, Stanford University (1997).
Waechter, C. and Keller, A., "Instant Ray Tracing: The Bounding Interval Hierarchy," Rendering Techniques 2006 (Akcnine-Moller, T., and Heidrich, W., Editors), Proc. 17th Eurographics Symposium on Rendering, pp. 139-149 (2006).
Waechter, C, and Keller, A., "Terminating Spatial Partition Hierarchies by A Priori Bounding Memory," Proc. 2007 IEEE/EG Symposium on Interactive Ray Tracing, pp. 41-46 (2007).
Wald, I., "On Fast Construction of SAH-Based Bounding Volume Hierarchies," Proceedings of the 2007 Eurographics/IEEE Symposium on Interactive Ray Tracing (2007).
Wald, I., "Realtime Ray Tracing and Interactive Global Illumination," Ph.D. Thesis, Saarland University (2004).
Wald, I.; Benthin, C; Wagner, M.; and Slusallek, P., "Interactive Rendering with Coherent Ray Tracing," EUROGRAPHICS 2001, 20(3): 153-164 (2001).
Wald, I; Boulos, S.; and Shirley, P., "Ray Tracing Deformablc Scenes Using Dynamic Bounding Volume Hierarchies. ACM Transactions on Graphics,"26(1) (2006).
Wald, I.; Mark, W. R.; Gunther, J.; Boulos, S.; Ize, T.; Hunt, W.; Parker, S C.; and Shirley, P., "State of the Art in Ray Tracing Animated Scenes," Eurographics 2007 State of the Art Reports (2007).

Ray tracing, such as ray tracing as described in a number of the above-listed documents, has a long history, but became interactive only recently. Rapid algorithms to construct the acceleration data structures cut down the preprocessing time and the actual ray tracing speed has been improved by tracing coherent packets of rays using SIMD (Single Instruction Stream. Multiple Data Stream) instructions of current processors. Most of the rays in global illumination computations are incoherent by intention and major parts of the simulation cannot benefit from tracing packets of rays.

However, in order to benefit from SIMD instructions, such SIMD instructions are typically used in a conventional manner by using multiple objects simultaneously, e.g., 4 triangles at a time, 4 bounding boxes at a time, and several split planes at a time. Compared to tracing packets, this has the major disadvantage that memory bandwidth is not reduced.

It would be desirable and valuable to provide computer graphics methods, systems, and computer program products utilizing SIMD instructions in which memory bandwidth requirements can be reduced, and which afford improved performance.

SUMMARY OF THE INVENTION

The invention provides systems, devices, methods and computer program code (software) products for, among other aspects and possible applications, enabling computer graphics systems to accurately and efficiently render images. Systems, devices, methods and computer program code (software) products in accordance with the invention are suitable for implementation or execution in, or in conjunction with, a computer graphics system including a computer for rendering images for storage or for display, such as on a display element, wherein the rendering of an image comprises utilizing the computer and/or other elements of the computer graphics system to generate pixel values corresponding to pixels in an image representation. Systems, devices, methods and computer program code (software) products in accordance with the present invention are suitable for implementation or execution in, or in conjunction with, a wide range of commercially available computer graphics systems or software environments, such as those available from MENTAL IMAGES GMBH of Berlin, Germany.

One aspect of the present invention relates to a computer graphics system comprising a computer and a display element, the display element being operable to display a human-perceptible image in response to a display-controlling electrical output from the computer, the computer being operable to generate the display-controlling electrical output based on calculations of pixel values for pixels in the image, respective pixel values being representative of at least one point in a scene as recorded on an image plane of a simulated camera, the computer being operable to generate pixel values for an image using a ray-tracing methodology, the ray-tracing methodology comprising the simulating of at least one ray shot from the pixel into a scene, or from the scene to a pixel, along a selected direction, the ray-tracing methodology further comprising the calculating of the intersections of rays and surfaces of objects in the scene and the simulating of trajectories of rays illuminating objects in the scene.

In conjunction with this aspect, the invention comprises methods, systems, devices and computer program code (software) for accelerating ray tracing by using acceleration data structures with high arity to enable processing of nodes using streaming SIMD (Single Instruction, Multiple Data) instructions with reduced memory requirements.

In another aspect, the invention comprises methods, systems, devices and computer program code (software) employing shallow bounding volume hierarchies (BVH) to enable rapid tracing of incoherent rays using streaming SIMD (Single Instruction. Multiple Data) instructions.

In one practice or embodiment of the invention, the SIMD instructions are used in construction of bounding volume hierarchies, tree traversal and leaf intersection.

In another practice or embodiment, the use of streaming SIMD instructions is enabled by increasing the arity of acceleration structures, which also reduces memory requirements.

In accordance with the invention, caching can be utilized to accelerate processing of shadow rays in a global illumination process without increasing memory requirements.

Also in accordance with the invention, sorted traversal can be utilized.

A further aspect of the invention includes methods, devices, systems or computer software code products (software) applying streaming SIMD instruction processing to leaf intersection, using a cache storing image-related triangles in SIMD-compatible form.

The SIMD-compatible form can include a vertex-index representation of triangles or other compressed representation.

The invention can also comprise sorting an additional index array.

Another embodiment or practice of the invention can comprise tree construction by flattening binary trees, flattening binary trees comprises collapsing a classical binary tree. Collapsing a classical binary tree can comprise keeping each k-th level of a given tree, and discarding intermediate levels.

Another embodiment or practice of the invention can comprise utilizing a selected stack-based tree traversal technique.

Yet a further aspect of the invention includes methods, devices, systems or computer software code products (software) utilizing any of (or a combination of) triangle intersection processing. SIMD caching and a vertex-index data structure or other compressed representation.

Other aspects of the invention can include techniques for accelerating processing of shadow rays for point-light-based global illumination, which can comprise any of (or a combination of): quitting traversal on first intersection found, omitting sorting of nodes pushed on the stack, not computing intersection distances, and starting traversal deeper in the tree instead of from a root node. The techniques for accelerating processing of shadow rays can also include utilizing a back-tracking technique that enables a plurality of nodes of the tree to be used as an entry point that yields correct results.

A further aspect of the invention includes methods, devices, systems or computer software code products (software) for executing a numerically robust triangle subdivision technique that subdivides triangles only when required, and wherein a degree of subdivision is automatically selected. The triangle subdivision technique can comprise an edge volume technique that evaluates the tightness of the bounding box of each triangle edge and subdivides the triangle until a selected threshold value is met. The edge volume technique can further include determining, for each edge of a given triangle, its axis-aligned bounding box. The edge volume technique can also include comparing, for a given triangle, the volume of the largest of the three boxes to a volume threshold, and if the volume is larger than the threshold, subdividing the triangle in the middle of the corresponding edge, and repeating the procedure for the two new triangles until the process is complete. In one practice or embodiment of the invention, the edge volume threshold is determined as a fraction of the volume of the scene bounding box, thus controlling the number of triangles generated by subdivision.

In selected practices or embodiments of the invention, the procedures described herein can be applied either as a pre-process before ray tracing, or for on-demand subdivision during ray tracing.

Another aspect of the invention can include reducing overlap of bounding volumes of geometry of a scene. Reducing overlap can comprise caching hierarchies for selected small portions of image components.

In still another aspect, the invention can include methods, devices, systems or computer software code products (software) for generating high arity data structures by collapsing classic data structure hierarchies by merging levels of the hierarchies.

In another aspect of the invention, for volume elements of a defined size, independent of object size, acceleration data structures are cached, and may be employed to construct a top-level acceleration data structure.

The techniques and procedures described herein of employing shallow BVH and using streaming SIMD instructions can be applied to at least one spatial partitioning scheme, which can include any of, or a combination of, kd-trees and BSP-trees.

The invention can also include applying streaming SIMD instructions to at least one object list partitioning scheme. The object list partitioning scheme can include bounding volume hierarchies.

Another aspect of the invention can also include, in addition to one or a number of the techniques described above, executing at least one operation that traces packets of rays.

Still a further aspect of the invention comprises processing a non-axis aligned geometry using a partitioning heuristic. The partitioning heuristic can be applied in any tessellation in order to provide crack free tessellation.

These and other aspects, examples, embodiments and practices of the invention, whether in the form of methods, devices, systems or computer software code products (software), will be discussed in greater detail below in the following Detailed Description of the Invention and in connection with the attached drawing figures.

BRIEF DESCRIPTION OF THE DRAWINGS

FIG. 10 is a table setting forth a comparison of axes-based and distance-based sorting.

FIG. 11 is a table showing measured rendering performance from invocation of the renderer to the final image for three exemplary scenes.

FIG. 12 is a table providing statistics about tree quality and ray tracing behavior of different acceleration kernels.

FIG. 13 is a table providing a general idea of the effectiveness of the use of SIMD instructions.

FIG. 14 is a table showing the performance of acceleration structure with a priori bounded memory.

FIG. 19 is a table setting forth factors of best, average, and worst surface area reduction resulting from applying the edge volume heuristic for triangle subdivision.

FIG. 20 shows graphs illustrating the relative increase in the number of triangles and corresponding rendering time for a range of threshold parameters t.

FIG. 21 shows graphs illustrating performance figures and number of generated triangle references over animation for several threshold parameters t.

FIGS. 22-25 are a series of exemplary code listings for various aspects of the invention.

FIGS. 31-33 are a series of diagrams, in isometric view, of the axis-aligned bounding box shown in FIG. 30, illustrating the partitioning of the bounding box with L- and R-planes.

FIG. 36 is a diagram of a general processing system according to various described aspects of the invention.

DETAILED DESCRIPTION

Figure 1:
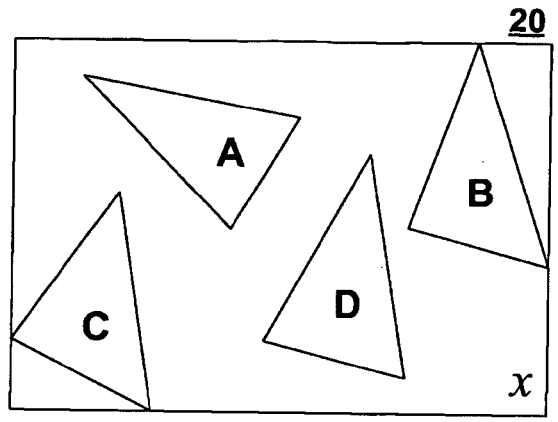
FIGS. 1-5 are a series of diagrams illustrating the splitting of a bounding volume according to a BVH technique.

The present description is divided into the following sections:
1. Shallow Bounding Volume Hierarchies for Fast SIMD Tracing of Incoherent Rays
   1.1 Introduction to Section 1
   1.2 n-ary Bounding Volume Hierarchy
      1.2.1 Memory Layout
      1.2.2 Tree Construction by Flattening Binary Trees
      1.2.3 Tree Traversal
      1.2.4 Triangle Intersection, SIMD Caching and Vertex-Index Data Structure
   1.3 Results
      1.3.1 Rendering Performance
      1.3.2 Memory Bound Performance
      1.3.3 Vertex-Index Triangle Representation
   1.4 Accelerating Shadow Rays for Point-Light-Based Global Illumination
   1.5 Results for Accelerating Shadow Rays
   1.6 Conclusion to Section 1
2. The Edge Volume Heuristic—Robust Triangle Subdivision for Improved BVH Performance
   2.1 Introduction to Section 2
   2.2 Subdivision Technique
      2.2.1 Edge Volume Heuristic
      2.2.2 Determining the Edge Volume Threshold $\epsilon_v$
      2.2.3 Implementation Details
      2.2.4 Reducing Overlap
   2.3 Results
   2.4 Conclusion to Section 2
3. Exemplary Code Listings
4. Digital Processing Environment; Efficient Construction of Acceleration Data Structures
5. Overall System and Technique 1. Shallow Bounding Volume Hierarchies for Fast SIMD Tracing of Incoherent Rays Photorealistic image synthesis is a computationally demanding task that relies on ray tracing for the evaluation of integrals. Rendering time is dominated by tracing long paths that are very incoherent by construction. The present invention therefore provides systems and techniques in which SIMD (Single Instruction, Multiple Data) instructions are used to accelerate incoherent rays.

As described herein, SIMD is used in hierarchy construction, tree traversal and leaf intersection. This is achieved by increasing the arity of acceleration structures, which also reduces memory requirements. As shown below, the resulting hierarchies can be built quickly and are smaller than known acceleration structures, while at the same time outperforming them for incoherent rays. The new acceleration structure speeds up ray tracing by a factor of 1.6 to 2.0 compared to a highly optimized bounding interval hierarchy implementation, and 1.3 to 1.6 compared to an efficient kd-tree. At the same time, the memory requirements are reduced by 10-50%. Additionally, there is shown how a caching mechanism in conjunction with this memory efficient hierarchy can be used to speed up shadow rays in a global illumination algorithm without increasing the memory footprint. This optimization decreased the number of traversal steps up to 50%.

1.1 Introduction to Section 1

Improving ray tracing performance has received significant attention in the art. One of the most popular acceleration structures for fast ray tracing is the kd-tree. Bounding volume hierarchies (BVH) belong to the simplest and most efficient acceleration schemes for ray tracing. Memory requirements and memory latency have been recognized as bottlenecks and fast tree construction has been investigated. Significant efforts have been expended with respect to the exploitation of SIMD instructions in modern processor environments for coherent packets of rays.

Techniques that perform physically correct simulations of light transport tend to shoot rays that are spread as widely as possible in order to increase efficiency, e.g., by employing quasi-Monte Carlo methods. As a result, most rays that account for global illumination effects are incoherent. Because of that, major parts of the simulation cannot benefit from tracing packets of rays. This has been recognized in professional rendering products as well. These products use SIMD instructions by intersecting multiple objects at a time. Compared to tracing packets, this approach has significant disadvantages, as traversal is not accelerated, and memory bandwidth is not reduced.

An aspect of the invention addresses the bandwidth problem by reducing the memory footprint of the acceleration data structure. A technique according to the present invention increases the arity of the acceleration hierarchy, which saves memory for nodes and pointers. The presently described techniques are applied in the context of efficient SIMD processing, and without the drawbacks of limited precision and median split tree construction. A further aspect of the invention shows how to use the memory layout of the new acceleration structure to contain additional data used to transparently speed up coherent rays. The described technique uses a form of backtracking without additional memory requirements and with entry points at every node. The present invention further teaches how to construct the acceleration structure in this case while still minimizing the cost function. In addition, the presently described data structure supports sorted traversal, which has been found to be crucial for good performance on current CPU architectures, especially for intersection rays.

1.2 n-ary Bounding Volume Hierarchy

Bandwidth problems are an issue for efficient streaming processing. The present invention reduces memory consumption by flattening the hierarchy and favoring larger leaves. This approach also allows for efficient streaming intersection of primitives. Axis-aligned bounding boxes, which are stored as a minimum and a maximum corner point, are used for bounding volumes. A detailed description of the memory layout is given below in Section 1.2.1.

As the typical SIMD width in current processors is n=4, the new BVH implementation is referred to herein as QBVH (i.e., Quad-BVH). However, it will be apparent from the present discussion that the techniques described herein may be readily extrapolated to apply to SIMD widths where n>4.

FIGS. 1-5 are a series of diagrams illustrating the splitting of a bounding volume 20 according to a BVH technique. As discussed further below, the same splitting technique may be used both in a binary BVH technique and the presently described QBVH technique. In FIG. 1, rectangle x represents an axis-aligned bounding box containing a portion of a scene that includes four primitives, i.e., triangles A, B, C, and D.

Figure 2:
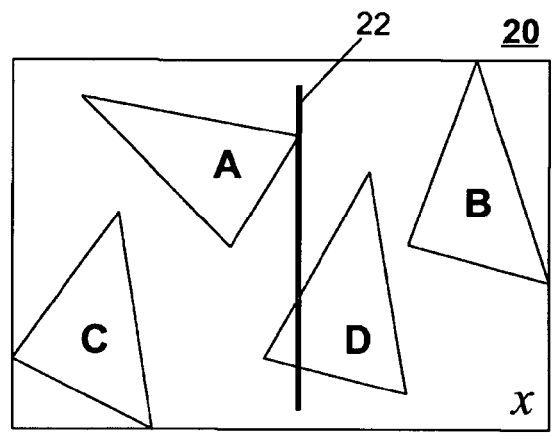

In FIG. 2, line 22 represents a proposed axis-aligned splitting plane candidate that is used to separate the primitives contained in box x into two groups, i.e., a first group comprising triangles A and C, and a second group comprising triangles B and D.

Figure 3:
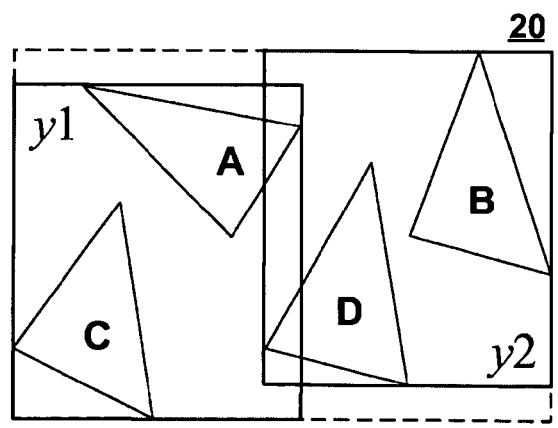

In FIG. 3, rectangles y1 and y2 represent axis-aligned bounding boxes that contain, respectively, the first and second groups of primitives.

Figure 4:
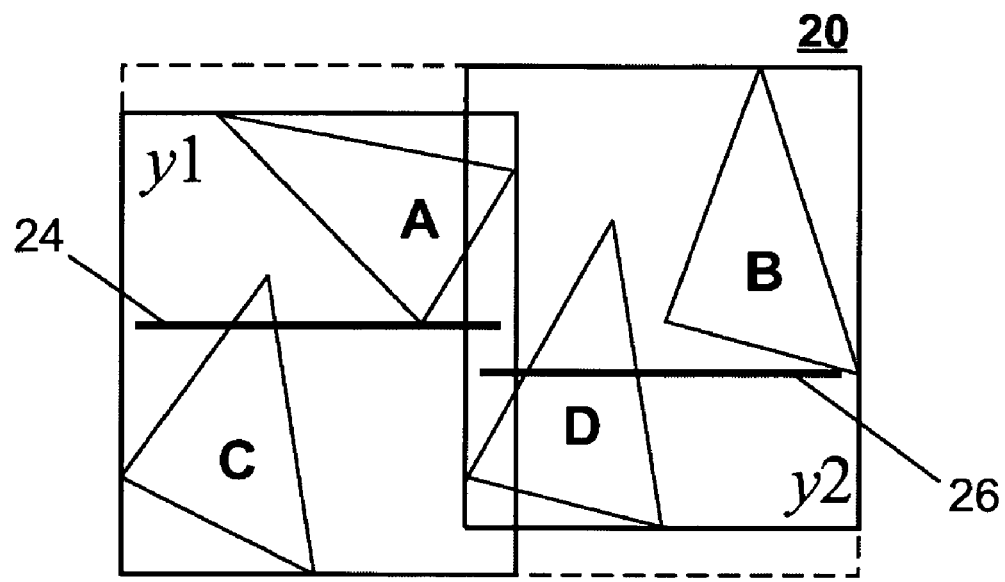

In FIG. 4, lines 24 and 26 represent proposed "second generation" axis-aligned splitting plane candidates that are used to separate the respective groups of primitives in axis-aligned bounding boxes y1 and y2 into subgroups. In the present example, the primitives in bounding box y1 are separated into two subgroups, one containing the single primitive A, and the other containing the single primitive C. The primitives in bounding box y2 are separated into two subgroups, one containing the single primitive B, and the other containing the single primitive D.

Figure 5:
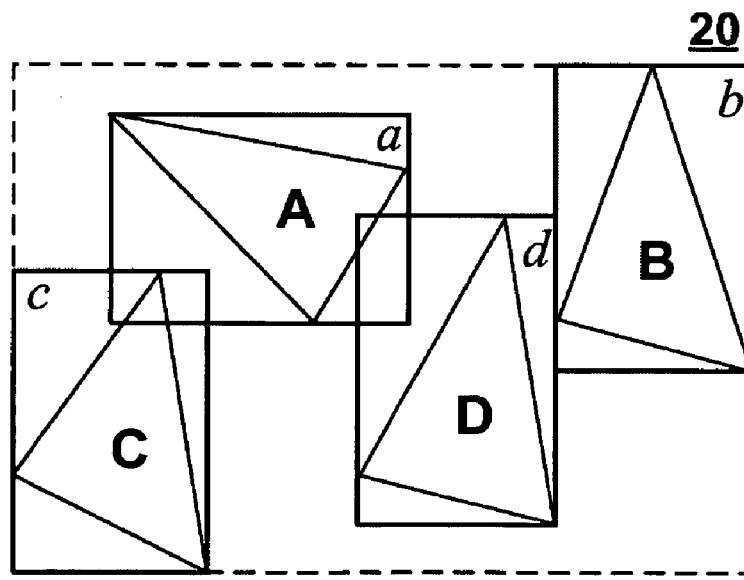

In FIG. 5, rectangles a, b, c and d represent axis-aligned bounding boxes that contain, respectively, individual primitives A, B, C and D.

In a conventional binary approach, nodes are created after each split. In other words, in the example shown in FIGS. 1-5, inner nodes (i.e., "branch nodes") would be created for boxes y1 and y2, and leaf nodes would be created for boxes a, b, c and d.

According to the presently described example of the invention, the same split plane proposals as for the binary case are used but instead of creating nodes after each split, the object sets are split a second time, resulting in four disjoint object sets.

Figure 6:
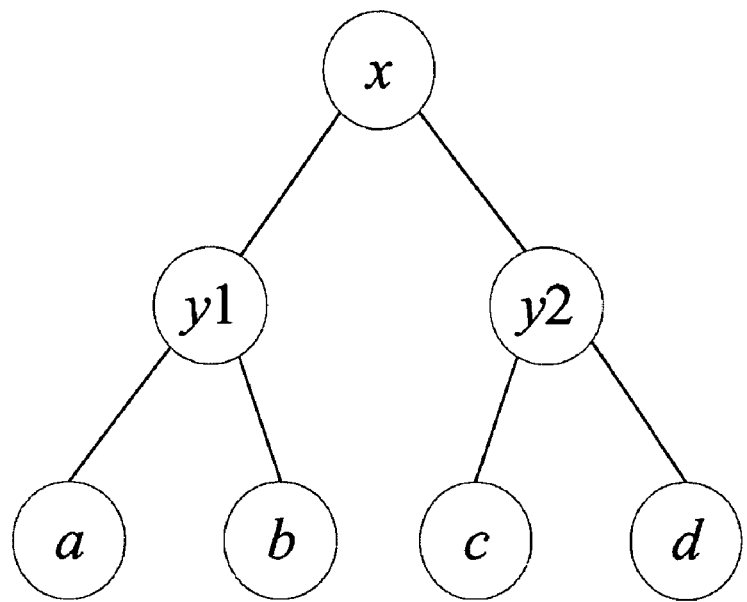
FIGS. 6 and 7 are a pair of side-by-side diagrams illustrating the difference between a binary BVH scheme and a QBVH scheme.
Figure 7:
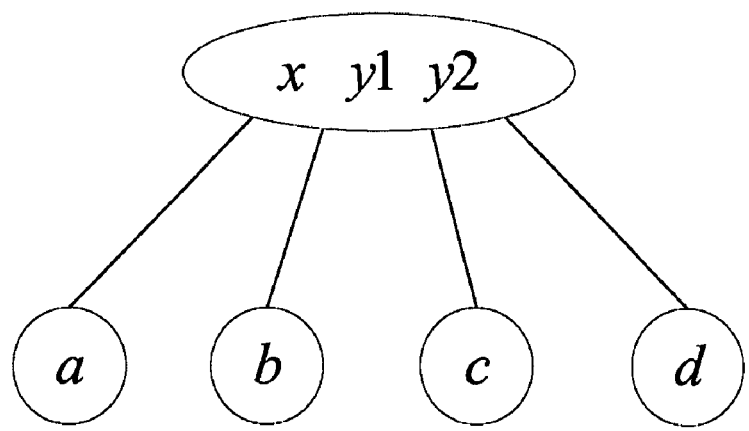

FIGS. 6 and 7 are a pair of side-by-side diagrams illustrating the difference between a binary BVH scheme and the presently described QBVH scheme.

In FIG. 6, a node is created for bounding box x. As discussed above, splitting bounding box x yields bounding volumes y1 and y2. Internal branch nodes are created for each of these bounding boxes, which are then split again, resulting in bounding volumes a, b, c, and d. In the present example, splitting terminates at this point, and leaf nodes are created for each of bounding volumes a, b, c and d.

In FIG. 7, the same splitting technique is used. However, nodes are created only after the second split. Thus, in effect, nodes y1 and y2 are collapsed into the root node x. The overall result is that root node x branches directly to leaves a, b, c and d.

It will be seen that in the presently described scheme each node contains the four bounding volumes of its children. Thus, the top-level node of the tree already contains four bounding boxes, which can be processed using SIMD.

Additionally, the four child pointers and the three axes of the proposed split planes are stored for each inner node. These split axes are used for an efficient, sorted traversal similar to binary BVHs as described in Section 1.2.3.

In Section 1.2.4, the paradigm of streaming processing and low memory consumption is applied to leaf intersection. This is achieved using a small cache storing the triangles in a SIMD-friendly form. This also allows more memory-efficient, but slower, representations of the triangle data without a major speed impact.

In Section 1.3.3 the vertex-index representation of triangles is compared to the direct 9 floats representation often used in real-time ray tracing. Other existing method for memory reduction can be incorporated as well. Cache-friendly padding of the node structure provides some additional memory, which can be used to improve performance. According to a further aspect of the invention, this is exploited to accelerate shadow rays, as described in Section 1.4.

1.2.1 Memory Layout

In real-time rendering systems, the triangle data is often sorted directly during tree construction for more efficient memory access in the leaf intersection. However, this is not an option in production rendering systems, as other parts of the renderer may depend on the original order. For this reason, an additional index array is sorted instead. In the presently described implementation, the following data layout was chosen for the tree nodes:

```
struct SIMD_BVH_Node {
    float bbox[2*4*3];
    int child[4];
    int axis0, axis1, axis2;
    int fill;
};
```

The result is a large BVH node with a size of 128 bytes, which perfectly matches the typical cache size of modern computer hardware. The four bounding boxes are stored in a structure-of-arrays (SoA) layout for direct processing in SIMD registers. Of course, the axes could be packed into a single value. However, for cache alignment reasons the size of 128 bytes is favorable. Packing the data into a single value would save only 10% of the total memory consumption. The integer (fill) is used to store additional data for optimizations later on. The tree data is kept in a linear array of memory locations, so the child pointer can be stored as integer indices instead of using platform-dependent pointers.

It is important to note that for a leaf, no additional (SIMD_BVH_Node) is created. The leaf bounding box is already stored in the parent, and die leaf data can be encoded directly into the corresponding (child) integer.

The sign of the child index is used to encode whether a node is a leaf or an inner node.

There exist various encoding possibilities. Which of these is the most efficient depends on the processor architecture and compiler. The most memory-efficient approach is to directly encode the leaf information into the remaining 31 bits. Without loss of generality, 4 bits are chosen for the number of triangles in the leaf, and the remaining 27 bits are chosen for the start index in the triangle array. Since the triangle intersection is performed using SIMD, the number is a multiple of 4. So up to 64 triangles per leaf can be stored and up to $2^{27}$ triangles can be indexed. Empty leaves are encoded in a special value (INT_MIN). Thus, the 4 bits can be used for the full 64 (i.e., 16×4) triangles. Note that when using bounding volume hierarchies the number of triangles per leaf is easily bounded, because forcing another split guarantees a reduction in the number of triangles.

If the upper bound of $2^{27}$ is not acceptable for certain applications, a slightly less memory-efficient version is created. The full 31 bits are used to index an additional data structure containing the leaf information. Another memory-efficient encoding strategy is to store only the start value of the triangle reference array and to mark the last triangle with a negative index in this array.

1.2.2 Tree Construction by Flattening Binary Trees

Figure 8:
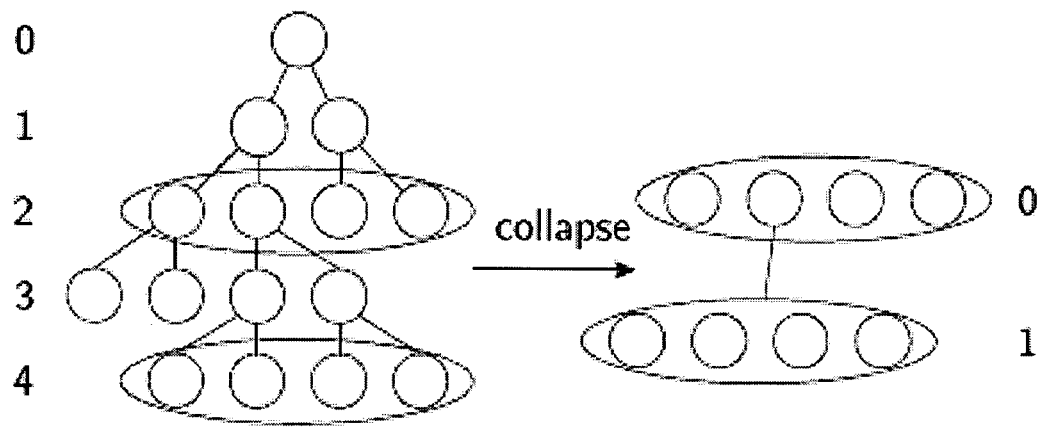
FIG. 8 is a diagram illustrating the construction of a QBVH, for k=2.

The n=$2^k$-ary BVH tree construction can be seen as collapsing a classical binary tree. This is illustrated in FIGS. 1-7, discussed above, for the case n=4. Classical build methods are used to create a binary tree. The tree is then collapsed by keeping each k-th level of the tree, and discarding the intermediate levels. This results in $2^k$ bounding volumes per node. FIG. 8 illustrates how a QBVH is constructed, for k=2, approximately halving the memory requirements.

This view allows the use of the same construction principles used for binary trees to construct $2^k$-ary trees. In an exemplary implementation, the described techniques were used to construct good quality trees with fast construction times. Min-max binning with 8 bins was used to approximate the surface area heuristic (SAH). This implementation is vectorized by the compiler and efficiently uses SIMD instructions. Only a fraction of the primitives is used for the SAH approximation in higher levels of the tree. Further speedup is achieved by precomputing the bounding boxes of the triangles in a SIMD layout, overwriting the triangle data. This way, the implementation can benefit from SIMD operations during construction without using additional memory. After construction, the triangle data is filled in. (If stored on disk, the triangle data is reloaded from disk.) The construction is additionally sped up by allowing more primitives per leaf resulting in flatter trees. In all measurements, a leaf is created whenever the primitive count drops below 17. Using this implementation, it is possible to get very fast tree construction times that are even comparable to the BIH.

FIG. 8 illustrates that the resulting tree consumes only a fraction of the memory needed by the original tree, at the expense of larger nodes. But this fits modern streaming SIMD architectures well. A large chunk of aligned data can be loaded and worked on in parallel.

While using four boxes per node would already be sufficient to enable SIMD processing of the above data structure, it is important to store along which planes (perpendicular to the canonical x-,y-, or z-axes) the objects were partitioned. The plane indices of the binary hierarchy are stored as three integers (axis0), (axis1), and (axis2), respectively. This approach allows the spatial order of the boxes to be exploited for a more efficient pruning using the sign of the ray direction during tree traversal.

1.2.3 Tree Traversal

Given a ray, the stack-based traversal algorithm starts by simultaneously intersecting the ray with the four bounding boxes contained in the root (SIMD_BVH_Node) using SIMD instructions. The pointers of the children with a non-empty bounding box intersection are sorted and then pushed onto the stack. The routine is repeated by popping the next element as long as there is one.

The ray is prepared prior to traversal by replicating the values for the maximum ray distance (tfar), the origin, and reciprocal of the direction across a SIMD register. Additionally the signs of the components of the ray direction are stored as integers to allow easy indexing of the near and far bounding box sides.

For the bounding box intersection a branch-free implementation of the slab test is used. The four boxes are intersected simultaneously with the replicated ray. The return value of this function is an SIMD mask containing all 1's when the respective box has been intersected and 0's otherwise.

Figure 9:
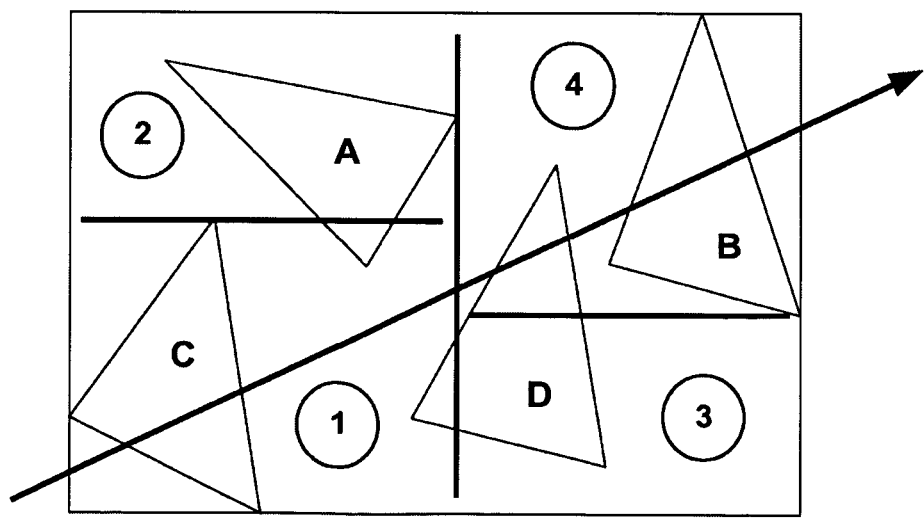
FIG. 9 is a diagram illustrating how, using split plane indices stored during tree construction, the sign of the respective component of the ray direction vector determines whether or not to swap the two corresponding children.

In order to enable an early pruning of the traversal, the nodes are pushed onto the stack according to the order determined by the ray direction. Using the split plane indices stored during tree construction, the sign of the respective component of the ray direction vector determines whether or not to swap the two corresponding children, as illustrated in FIG. 9. This is similar to the order a kd-tree would define using the same split plane proposals.

Two implementations of this sorting turned out to be good choices. The most elegant variant is based on SIMD sorting techniques that work branch-free on SIMD registers by using masking and swizzling.

First, the four child pointers are loaded into a SIMD register. Second, an SIMD mask is constructed for each of the three axes stored in the BVH node based on the sign of the ray direction of that component. Third, this mask is used to select either the original value or a shuffled value resulting in a correctly ordered SIMD register. Finally, the contents of the SIMD child register are pushed onto the stack in a scalar way. This is done by pushing a child pointer and then decrementing the stack top pointer by the corresponding entry of the reordered result mask from the bounding box intersection. For this purpose, this mask has to be ordered in the same way as the child pointers to push the correct children onto the stack. The decrement works because the result mask contains all ones in case of an intersection, which equals −1 as an integer, and all 0's else.

Surprisingly, an implementation using cascaded branches based on the ray direction signs and split axes is equally fast on an Intel Core 2 processor in the general case and even slightly faster when only primary rays are traced. This may be due to the sophisticated branch prediction of this particular processor. The implementation is also much simpler than the SIMD sorting. The first decision based on (axis0) chooses which two of the four children should be intersected first. In FIG. 9, this corresponds to the decision whether to visit (A, C) or (B, D) first. The second and third decision sort each of the child pairs again, resulting in (A, Q or (C, A) and (B,D) or (D,B).

As the bounding boxes are already intersected while processing the parent, a late early-out is performed: if a triangle intersection is found, pruning of bounding boxes which are farther away can only be done one step later, during processing of the next node. Additionally storing the distance of the bounding box intersections with the child pointer on the stack solves this. While on current Intel processors and the Cell processor the traversal is faster without this "optimization", it may pay off for wider SIMD operations as announced for example for the Larrabee processor.

In addition, it should be noted that die described experiments report fewer bounding box intersections, as compared to sorting the bounding boxes by their actual intersection distances with the ray.

FIG. 10 is a table 100 setting forth a comparison of the two methods. Table 100 shows the number of bounding box intersections, in millions, using (1) axes-based sorting and (2) distance to box entry point, measured using path tracing (512×512 with 16 samples per pixel).

1.2.4 Triangle Intersection. SIMD Caching and Vertex-Index Data Structure

It is possible even to get away with much flatter hierarchies at the cost of leaves that contain more triangles. This approach further improves traversal speed and also enables the efficient use of streaming SIMD instructions to process multiple objects at once. In contrast with other approaches, the present technique uses single rays, and avoids performance losses caused by masking.

If memory were of no concern, the triangle data in the leaves could be precomputed and stored in an SIMD-friendly layout. Since most of the time this is not practical, the original triangle layout is left untouched. For high-performance ray tracing, 36 or 48 bytes per triangle are used. The more compact vertex-index layout stores all vertices in an array and only three indices per triangle referencing these vertices. This is a widely used layout in 3D modeling applications. Usually this introduces performance penalties due to an indirection in memory access.

Figures 15, 16, 17:
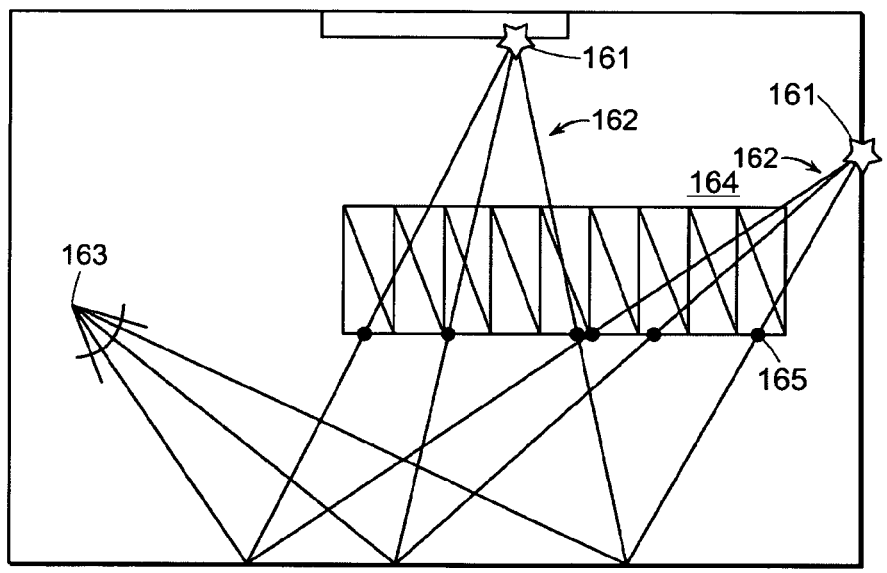
FIG. 15 is a table comparing rendering times and memory usage of a flat triangle layout with 36 bytes per triangle and a vertex-index based representation.
FIG. 16 is a diagram of a portion of a scene illustrating an aspect of the invention in the setting of a point-light-source-based global illumination renderer.
FIG. 17 is a table setting forth the number of box intersections and total time to image for a normal QBVH version and an entry point cache version.

The described exemplary implementation supports the 36-bytes layout as well as the vertex-index form. Four primitives are efficiently intersected at once using a branch-free SIMD version of the test described in the art. For this test, the triangle data has to be collected and swizzled to a state-of-die-art SIMD layout. This already works surprisingly fast, but to maximize performance, a small direct-mapped cache is used for each rendering thread to store the precomputed layout. This caching mechanism also allows the use of vertex-index representation for the triangle data without significant performance loss, as shown in FIG. 15, discussed below.

1.3 Results

The described BVH has been integrated into two different rendering systems. The first one contains highly optimized implementations of a BIH and a memory-bounded Ad-tree, and uses different unbiased rendering techniques. This allows for a direct comparison of rendering performance on the same hardware and using the same rendering algorithm. The second system is based on instant radiosity and is used for the entry point caching comparison in Section 1.4. All measurements were performed using a single thread on an Intel Core 2 CPU at 2.33 GHz. Note that all measurements were performed in a full rendering system where sampling, shading and texture look-up are a significant part of the rendering time and are not sped up by faster ray tracing.

Section 1.3.1 and 1.3.2 use the first rendering system to compare the QBVH to the other acceleration structures. This system only supports the 36-byte triangle layout. Two versions of the QBVH are compared. The first one does not employ the SIMD triangle caching from Section 1.2.4 and is called ncQBVH. It uses leaves from 1 to 8 triangles. The second version uses a SIMD cache size of 128 entries with a leaf size of 16 triangles.

In Section 1.3.3 the second renderer is used to evaluate the speed impact of using vertex-index based triangle representation.

1.3.1 Rendering Performance

To estimate the performance in a usual rendering setup three scenes of different complexity were used; all parameters were left at their default settings. These scenes included (1) a conference room having IM triangles; (2) the Sponza atrium, an interior scene in a complete house having 900K triangles; and (3) a power plant model having 12M triangles. The conference room and house interior were rendered with a bidirectional path tracer using 8 bidirectional samples per pixel. The power plant was rendered with a path tracer and 32 paths per pixel. These scenes were used to compare the presently described QBVH technique against BIH and a kd-tree.

FIG. 11 is a table 110 showing the measured rendering performance from invocation of the renderer to the final image for the conference scene, interior scene and power plant scene. The numbers in parentheses are die number of triangles, in millions. MEM is the amount of memory needed by the acceleration structure; ACC is the type of acceleration structure used (&d-tree, BIH, non-cached QBVH, and cached QBVH); ACT is the tree construction time; TTI is the total time to image; and RTT is the pure ray tracing time, i.e., the amount of time spent in the ray tracing kernel.

It will be seen in table 110 that QBVH uses relatively little memory, while even outperforming the tree construction times of the BIH. It should also be noted that the ray tracing kernels were all included in the same rendering system for a precise comparison. This made some optimizations in the tree construction impossible, optimizations which would allow building the QBVH for the plant in around 14 seconds.

FIG. 12 is a table 120 providing detailed statistics about the tree quality and ray tracing behavior of the different acceleration kernels (ACC). Table 120 shows, for the respective kernel and scene, in this order: the total number of inner nodes, the total number of non-empty leaf nodes, the average number of triangles per leaf node, the average number of intersected triangles per ray, the average number of traversed inner nodes per ray, and the average number of intersected leaf nodes per ray. The measurements have been made under the same conditions as in Table 110 shown in FIG. 11.

FIG. 13 is a table 130 that provides a general idea of how effective the use of SIMD instructions is, by comparing packet traversal to the QBVH in the setting for which it has not been designed, i.e., casting coherent primary rays only. Specifically, table 130 shows a comparison of frames per second for 2×2 SSE packets in a BIH vs. mono ray BIH vs. mono ray QBVH on an Intel Core 2 Duo (480×320). In the packet version, flat shading and ray creation is also done using SIMD. Most of the performance benefit of the packets is due to coherent memory access, which is already lost for Interior 2, where QBVH and packet traversal perform about the same. So the QBVH is able to make effective use of SIMD instructions, even without exploiting high coherence for memory access.

1.3.2 Memory Bound Performance

Memory consumption is an important part of any rendering system. All three acceleration structures allow a priori bounding of the memory used. FIG. 14 is a table 140 showing the performance of each acceleration structure with a priori bounded memory (MEM). The same scenes and rendering settings as in die previous section were used. ACC is the type of acceleration structure used. The timings are given for the acceleration structure construction time (ACT), the total time to image (TTI) and the time spend in the ray tracing core (RTT).

As shown in table 140, the kd-tree has serious problems with tight memory bounds (note that a build of the conference room with 5 MB was impossible to render in acceptable time) while the QBVH reacts especially robustly to limiting the memory.

1.3.3 Vertex-Index Triangle Representation

The second renderer supports switching between the flat 36-byte triangle representation and a more memory-efficient index-based representation. The indexed representation is more time consuming for ray tracing because an additional indirection has to be performed prior to triangle intersection. This overhead is reduced when the leaf-caching-based QBVH implementation is used. The same scenes as in the previous sections were used for this comparison. Each rendering was performed at a resolution of 800×600 pixels with 16 passes.

FIG. 15 is a table 150 that compares the impact on rendering times and memory usage resulting from the use of the flat triangle layout with 36 bytes per triangle (36 TTI) and a vertex-index (VI) based representation. TTI is the total time to image and MEM is the memory-consumption of the triangle data. The resulting QBVH trees are the same as in Section 1.3.1 and both versions use the SIMD triangle layout caching.

1.4. Accelerating Shadow Rays for Point-Light-Based Global Illumination

Visibility rays (or shadow rays) are an essential part in many rendering algorithms with deterministic connections of points, e.g., in bidirectional path tracing or instant radiosity. They are merely used to determine the mutual visibility of two given points. Any intersection of an interval on a ray with an object is sufficient to determine occlusion. Therefore, three optimizations are: (1) quitting die traversal on the first intersection found; (2) omitting the sorting of the nodes pushed on the stack; and (3) not computing intersection distances, which can simplify object intersection routines. Another important general optimization is to start the traversal deeper in the tree instead of from the root node. If a suitable entry point is known, this can save major parts of the process of traversing down to the first leaf.

In contrast with an earlier approach that uses an entry point search for large bundles of rays in/kd-trees, the presently described approach uses a backtracking method that allows every node of die tree to be used as an entry point and will give correct results. For the backtracking, the parent is stored with each node. As the SIMD BVH Node still provides some room to store additional information, it is possible to keep the index of the parent node without additional memory requirements.

This method proved especially suitable for shadow rays. It is possible to take advantage of implicit coherence of shadow rays and start tracing at the last node where an intersection was found.

FIG. 16 is a diagram of a portion of a scene 160 illustrating the presently described approach in the setting of a point-light-source-based global illumination renderer. FIG. 16 illustrates spatial coherence of occluders when using point-light-based global illumination.

Scene 160 includes a plurality of point light sources, represented by stars 161. Rays 162 connect vertices of interaction along paths that connect light sources 161 and cameras 163. Some of these rays are obstructed by an occluding object 164, comprising a plurality of tessellated triangle primitives. Occlusions 165 occur at the intersections of rays 162 with a visible surface of object 164.

The entry point cache is able to quickly find occlusions, since the visibility rays to the same point light source (depicted with a star) exhibit some coherence. The big leaves of the QBVH make a hit even in the same leaf more likely. The performance gain is achieved in a way which is completely transparent to the underlying renderer; no additional complexity is introduced to existing systems (as would be the case for ray packets).

Consecutive visibility queries result in occlusion by different but spatially nearby triangles. This fact can be exploited by using the node of the last occlusion as the entry point for the next shadow ray. The tree is then searched for intersecting geometry using a backtracking algorithm: the regular traversal stack is initialized with the children of the entry point node and intersected the usual way. If no occlusion has been found so far, the entry point node is the root node, so there is no special code for this case. Next, if the stack is empty, all children of the parent of the entry point node are pushed to the stack, except the one that has just been processed. For the next iteration, the entry point node is set to its parent. The algorithm terminates when the parent of the root node is about to be processed. So the regular traversal is only extended by one variable and one additional loop. If a leaf node is found as an occluder, its parent node is cached for this point light source.

What remains is finding a suitable entry point for an occlusion query. The described algorithm above is correct for any entry point, but an acceleration can only be expected when the hit is close to a previous occlusion. The rendering system uses occlusion queries given by two points, where the first one is the path's hit point and the second one is the light source position. In our implementation we use a simple unbounded (i.e., hashed) voxel grid and the light position as hash. For each position the last found occlusion entry point is recorded. If no occlusion occurred, the root node is used. In the statistics, a hash table with 4096 entries was used, the scene and divided the scene into $(10 \text{ cm})^3$ voxels (assuming the scenes are modeled in the correct scale).

This optimization can be transparently incorporated into any existing rendering system which spawns shadow rays with two points to be checked for visibility.

1.5 Results for Accelerating Shadow Rays

All benchmarks were done using a single thread on a Core 2 processor. Extending this to a multi-threaded version is straightforward for the application of photorealistic rendering, where the fast tree construction times vanish compared to the time required for ray tracing. The resolution for the benchmarks are 800×600 pixels and for the point light based approach 16 rendering passes were used with an average of 22 point light sources per pass. Primary rays were created per scanline, additional speedup can be expected when using Hilbert curves. We compare the normal implementation of the QBVH (using only die standard shadow optimizations) with the one using the entry point caching. The statistics contain the total number of bounding box intersections performed for the final image. The speedup is of course larger in scenes with a larger amount of occlusion. This explains why the interior scene only shows a marginal speed up.

FIG. 17 is a table 170 of results. Table 170 sets forth a comparison of the number of box intersections and total time to image between the normal QBVH version (N#BBox, NTTI) and the entry point cache version (C#BBox, CTTI). The images at the beginning of this paper show the test scenes used. For the measurement they were rendered only at a resolution of 800×600 pixels with 16 passes and an average of 22 point light sources per pass. Conference 2 is the same conference scene but with the camera placed partly under the table.

The caching method could also be used for other acceleration structures. But compared to acceleration structures like the kd-tree, the BIH or binary BVHs which use many, very densely packed, small nodes, this method works especially well for the QBVH. The additional memory requirement of one more parent index per node would result in 50% more memory for standard 8 bytes W-tree nodes.

The approach can also be used for non-shadow rays. Then the procedure cannot benefit from the early-out of shadow rays, i.e., processing must always continue up to the root node. Still it can be beneficial, if the rays expose some kind of coherence, for example primary rays from the eye or coherent reflections. This allows the ray tracing core to transparently exploit implicit coherence by caching previous intersection entry points without changing the interface and without performance loss when incoherent rays are used.

1.6 Conclusion to Section 1

Instructions are applied efficiently for accelerating the tracing of single rays, while keeping the memory footprint of die techniques as low as possible. The described techniques are relatively straightforward to use in a wide range of applications and still allows for taking advantage of modern computer architectures. We showed that the performance of our algorithm is better than current high performance single ray tracing algorithms and die memory requirements are reduced due to the flat hierarchies and caching we use.

Contrary to tracing ray packets to reduce memory bandwidth, higher arity trees achieve the reduction of memory bandwidth by just using less memory. This in turn increases cache coherence and thus effectively reduces die sum of latencies.

The approach may be generalized to higher arity. A multiple of 4 perfectly supports current processor's streaming SIMD extensions (AltiVec, SSE). In contrast to tracing ray packets, the implementation on novel architectures like the CELL and GPUs with CTM or CUDA is simplified; the 16-way SIMD path of Intel's Larrabee processor is an obvious candidate for our algorithm and the large node size suits modern cache architectures and memory layouts very well.

Experiments showed that forcing the same split plane axis for all three splits does not introduce severe performance penalties and the simplified sorting step in the traversal routine can even pay off for a SIMD width of four in some scenes. With the availability of wider SIMD units, this approach has to be further investigated.

Additionally an implementation of this acceleration structure as special purpose hardware (for example in an FPGA) looks very promising.

The tree construction could also be improved. While using the standard binary tree construction for building n-ary BVHs is a simple and practical approach, faster build times could be achieved if an equally good heuristic could be found for multiple split planes at once. The entry point cache could be extended by a better hashing mechanism to accelerate bidirectional light transport algorithms equally well as point light source based ones.

2. The Edge Volume Heuristic—Robust Triangle Subdivision for Improved BVH Performance The use of axis-aligned bounding boxes is a basic technique to accelerate geometric algorithms as for example ray tracing. It is a known problem that efficiency suffers, if the axis-aligned bounding volume contains major parts of empty space, which, in the case of ray tracing, causes more ray-object-intersection tests than required. The impact of this problem can be reduced by subdividing triangles at the cost of a larger memory footprint. We present a subdivision algorithm that is designed to generate only very few additional triangle references. Compared to previous approaches the algorithm is numerically robust, and simpler to implement and use. For formerly problematic scenes a speedup of up to a factor of 10 could be achieved, while the number of triangle references increased only by 16%.

2.1 Introduction to Section 2

Improving the performance of ray tracing through the use of different acceleration structures has been investigated in detail. Among the most successful acceleration structures is the kd-tree. Recent research has demonstrated that bounding volume hierarchies (BVH) based on axis-aligned bounding volumes are competitive to or even outperform kd-trees. For both kinds of acceleration data structures fast traversal algorithms have been developed.

An advantage of a BVH is the small memory footprint compared to a standard kd-tree, because each object is only referenced once.

Even though a BVH can be as fast as a kd-tree, there are scenes where the resulting performance is far worse. This is a direct consequence of the principle that every object should only be referenced once: Bounding boxes that contain large amounts of empty space increase the number of ray object intersections.

This problem becomes especially apparent for axis-aligned boxes enclosing non-axis-aligned geometry as it results from, e.g., rotation: A triangle with a normal along one of the canonical axes has a zero volume axis-aligned bounding box, while any other orientation increases the volume and causes the triangle to be tested against more rays although the probability of hitting the triangle remains the same.

In the context of ray tracing with bounding volume hierarchies an advanced solution to the above problem has been investigated and was called early split clipping. That approach provided a triangle splitting method based on the surface area of the triangle bounding volume and used an axis-aligned plane to split a triangle into three triangles, resulting from one triangle and one quadrangle. The approach of early split clipping reduces empty space contained in bounding volumes, which in addition reduces overlap and thus improves overall performance.

However, considering surface area also causes triangles to be split that are already tightly packed in a bounding volume (e.g., larger triangles with normals parallel to the canonical axes). In addition the splitting threshold is based on user experimentation per scene and triangles are split even when no speedup can be achieved.

While one might argue that the same benefits can be obtained using a kd-tree, especially when bounding the memory of the kd-tree construction, both approaches have to clip triangles against planes, which is a numerically tricky and costly operation.

The following description addresses some of these disadvantages by introducing a numerically robust triangle subdivision (i.e., in contrast to splitting) technique that only subdivides triangles where required, thus retaining the biggest advantage of bounding volume hierarchies, the small memory footprint. This heuristic is based on the observation that not all large triangles affect the performance of a SAH-based BVH significantly but only the one that cannot fit tightly into a bounding box. In addition, there is described a technique for automatically choosing the level of subdivision. This is especially important when animations are rendered and the scene configuration changes over time.

2.2 Subdivision Technique

In order to improve the performance of bounding volume hierarchies, die idea of subdividing geometry is followed, and there is described an economical edge volume technique that only moderately increases the memory footprint.

This new technique (see Section 2.2.1) measures the tightness of the bounding box of each triangle edge and subdivides the triangle until a certain threshold $\epsilon_v$ (sec Section 2.2.2) is met.

2.2.1 Edge Volume Technique

For each edge of a triangle, a subdivision technique determines its axis-aligned bounding box. The volume of the largest of the three boxes is compared to a volume threshold $\epsilon_v$. If the volume is larger than die threshold the triangle is subdivided in the middle of this edge, which is easily implemented in a numerically robust manner. The procedure is repeated for the two new triangles until it terminates.

Figure 18A:
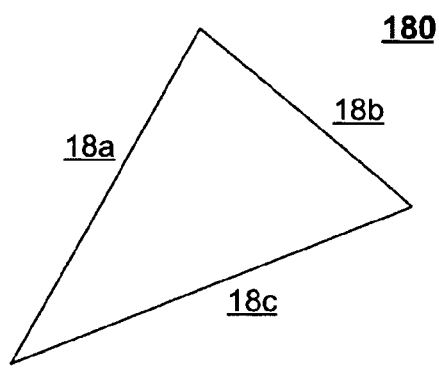
FIGS. 18A-D are a series of diagrams illustrating recursive subdivision of a triangle along the longest edges.

FIGS. 18A-D are a series of diagrams illustrating recursive subdivision of a triangle along the longest edges. In FIG. 18A, triangle 180 has three edges 18a, 18b, 18c. An axis-aligned bounding box is determined for each of these edges. The volume of the largest of these bounding boxes is compared with the volume threshold $\epsilon_v$.

Figure 18B:
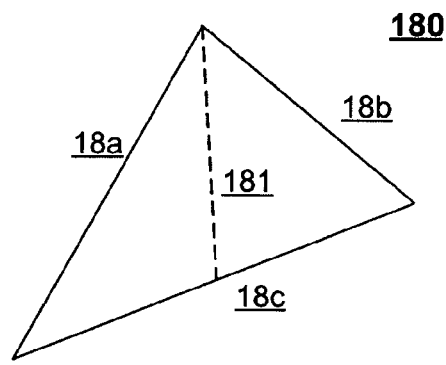

For the purpose of the present description, it is assumed that the threshold has been exceeded with respect to edge 18c. In FIG. 18B, the triangle 180 is then subdivided along broken line 181 by connecting the midpoint of edge 18c to the opposite triangle vertex. The subdivision of triangle 180 results in two triangles, which are subject to the same edge threshold test.

Figure 18C:
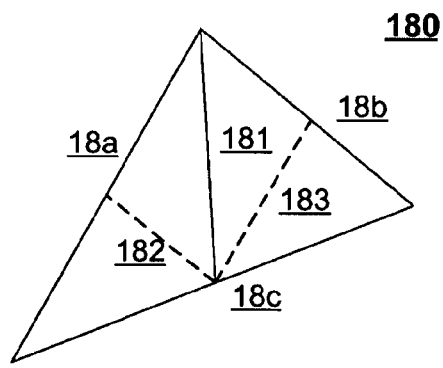
Figure 18D:
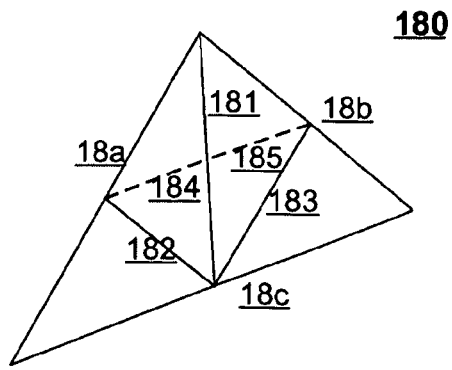

In FIG. 18C, the two triangles are further subdivided along broken lines 182 and 183. In the present example, it is assumed that only the two center triangles have at least one edge that exceeds the threshold $\epsilon_v$. In FIG. 18D, these two triangles are divided one more time along broken lines 184 and 185. Now, since none of the triangle edges exceed threshold $\epsilon_v$, the subdivision process terminates.

The heuristic guarantees that without any knowledge of topology, identical operations will be performed on shared edges. Consequently the resulting bounding boxes fit without gaps, which overcomes precision issues of clipping and watertight meshes (i.e., tessellation) will remain watertight after subdivision. This is true for any symmetric subdivision of edges.

Note that using a heuristic not based on edges, like e.g., bounding box surface area, cannot guarantee watertight subdivision. Cracks can occur, because shared edges are not necessarily subdivided in an identical way. In addition, a surface area criterion would divide large triangles regardless of the tightness of the bounding box, which is not memory efficient. In fact the edge volume heuristic is economical as it only subdivides triangles with very inefficient bounding boxes.

2.2.2 Determining the Edge Volume Threshold $\epsilon_v$

The threshold $$\epsilon_v(t) := \frac{V}{2^t}$$

is determined as a fraction of the volume V of the scene bounding box and thus controls the number of triangles generated by subdivision.

Over a broad range of scenes it turned out that choosing the threshold parameter t=14 as a default value yields good results with respect to increased triangle references and performance. With this threshold value many scenes that already exhibit high ray tracing performance are not subdivided at all or the increase of triangle references is less than 1%. Thus it is safe to rely on a fixed parameter t. But as with any heuristic, specially constructed scenes may break the assumption of course (for example a single thin diagonal triangle). For this kind of scenes the user may have to choose the parameter t by hand.

In Section 2.3 the impact of varying t is quantified for different bounding volume hierarchy unfriendly scenes.

This simple threshold selection is of course not limited to the edge volume heuristic but can be used (with a different scale) for example for the early split clipping approach.

2.2.3 Implementation Details

The procedure can be applied either as a pre-process before ray tracing or for on-demand subdivision at the beginning of the tree construction. The first variant is especially useful as it can be used to upgrade any existing ray tracing module without modifying the internals. The second variant is transparent for the user and just produces a different tree during construction.

For each triangle the algorithm performs the recursive subdivision procedure. As the bounding volume hierarchy construction only uses the bounding boxes during construction, it is memory-efficient to output the bounding boxes with the original triangle reference instead and in place of the subdivided triangles.

Usually a BVH contains more than one triangle per leaf. An additional optimization during tree construction is to remove references to the same triangle in each leaf. In our experiments this resulted in a speedup of about 10%.

The scan over the triangles is so efficient, that it even pays off, to have a pass that only counts die number of generated triangles, to allocate memory accordingly, and to scan the data again to generate the bounding boxes.

The remaining problematic cases are overlapping bounding boxes that cannot be separated. This problem is ameliorated by the fact that efficient bounding volume hierarchies usually reference more than one triangle per leaf thus grouping some of the overlapping geometry in one box, which reduces the overall overlap.

2.2.4 Reducing Overlap

A related problem is now addressed. The idea of ray tracing geometry animated by rigid body transformations is to compute an acceleration data structure for the rigid components in advance, to apply the rigid body transformations, and then to combine the resulting transformed objects in a bounding volume hierarchy.

As most of the hierarchies are cached, building the top-level hierarchy is reasonably inexpensive. However, this approach fails when large parts of the geometry overlap, because all overlapping parts have to be checked, which results in a notable slowdown. This happens, for example, for rotating tires on cars, or the joints of a door, where a convex part of geometry is enclosed by a non-convex one.

In accordance with the present invention, one solution is as follows. Instead of caching the hierarchies for the rigid components, the hierarchies are cached for small parts of the components. Building the top-level bounding volume hierarchy is then slower, however, this is amortized, because the overlap is dramatically reduced resulting in a higher performance of the hierarchy.

2.3 Results

The subdivision heuristic was applied to a set of diverse scenes in order to verify its versatility. The benchmarks were performed using an implementation of the QBVH using single thread primary rays on a Intel Core2 Duo 2.4 GHz processor.

First, four static scenes were considered:

1. Dragon, Buddha and Bunny scenes were included to verify that for many small triangles of roughly the same size the heuristic does not add any new triangles in the used parameter range. These kinds of scenes do not benefit from subdivision.

2. A Space Ship scene was chosen to represent a kind of worst-case scenario for classic bounding volume hierarchies: It consists of long thin triangles for the outer hull and many small triangles for details. Additionally this object is rotated by 45° in space.

3. A Kitchen scene, one frame from die BART animation repository, was selected as a scene where, instead of moving die camera, the triangles are transformed.

4. The Sponza atrium scene is a typical architectural model, where many triangles are parallel to the canonical planes. While classic heuristics like the surface area heuristic can build efficient bounding volume hierarchies for such scenes, performance drops dramatically, if geometry is rotated and bounding boxes increase in volume.

FIG. 19 is a table 190 setting forth factors of best, average, and worst surface area reduction resulting from applying the edge volume heuristic for triangle subdivision. The theoretical maximum of 0.25 is achieved in some cases. Even though die factor of the worst area reduction is quite large, the average area reduction shows die effectiveness of the heuristic.

A higher threshold parameter t improves performance, but also increases the memory footprint. Both numbers are related in FIG. 20, where graphs 200, 202 and 204 show the relative increase in the number of triangles and corresponding rendering time for a range of threshold parameters t. As expected, render time improves until it asymptotically reaches saturation and the number of triangles increases with an asymptotically exponential behavior. The consistent behavior over quite different scenes clearly shows dramatic performance improvements at already very moderate increase in the number of triangles.

A clearly consistent improvement over the test scenes can be observed and it is especially interesting that major performance improvements are obtained at already a moderate increase of the number of triangles.

The second test consists of rotating the well known Sponza atrium scene to illustrate the adaptivity of the edge volume heuristic. First, the scene is first rotated by 90°, 20°, and 30° around the x-axis, y-axis, and z-axis in 32 steps. Second, the scene is rotated another 32 steps to its final position −180°, 0°, and 90° where all large triangles are again axis-aligned. FIG. 21 is a pair of graphs 210 and 212 illustrating an application of the presently described technique to the Sponza atrium under rotation.

In FIG. 21, graphs 210 and 212 show the performance figures and the number of generated triangle references over the animation for several threshold parameters t. The more the architectural model becomes rotated, the more bounding boxes of previously axis-aligned geometry become inefficient, which is reliably avoided by the subdivision heuristic (threshold parameter t=14). The graphs in the bottom row show how the frame time is improved and how many triangles are added by the subdivision heuristic for the unsubdivided geometry (base) and three subdivision thresholds over die 64 frames of die animation.

Again the heuristic proves to be reliable: In simple cases, no triangles are added. When bounding boxes become inefficient a moderate increase in the number of triangle references avoids the dramatic performance drop.

Subdividing an edge in the middle results in two new bounding boxes that each have one-eighth of the original volume, because the split edges remain diagonals of their bounding boxes. Since the described tree construction technique is based on the SAH, it is interesting to look at the reduction of the triangle's bounding box surface area upon subdivision.

2.4 Conclusion to Section 2

Section 2 introduces an economical heuristic to subdivide triangles such that the amount of empty space in bounding boxes is efficiently reduced. The technique is numerically robust, and can be used as a topology unaware preprocess to any renderer. Significant performance improvements already result from very moderate additional memory requirements.

While die technique has applications in collision detection and occlusion culling, too, there are two more points of future interest: There are situations, where a global volume threshold may be not sufficient and a local threshold may perform better. Furthermore, it would be desirable to find criteria to identify situations where neither the presently described heuristic nor the surface area heuristic can reduce overlap.

3. Exemplary Code Listings

FIGS. 22-25 are a series of exemplary code listings for various aspects of the invention described above.

FIG. 22 is an exemplary code listing 220 of an older version of a node of an acceleration data structure in accordance with an aspect of the present invention, in a processor where the SIMD width is n=4. A newer version of the acceleration data structure is set forth above in Section 1.2.1—Memory Layout.

FIG. 23 is an exemplary code listing 230 of a tree traversal technique in accordance with an aspect of the present invention, in which one ray is intersected with four bounding boxes.

FIG. 24 is an exemplary code listing 240 of a cascaded "if" statement in an implementation using cascaded branches based on the ray direction signs and split axes, as described above in Section 1.2.3—Tree Traversal.

FIG. 25 is an exemplary code listing 250 of a technique, in accordance with an aspect of the present invention, for accelerating shadow rays.

4. Digital Processing Environment; Efficient Construction of Acceleration Data Structures There is now provided a description of a digital processing environment in which aspects of the invention can be implemented. There is further provided a description of methods, structures, and systems in accordance with ray tracing techniques, in particular with respect to the efficient construction of acceleration data structures useful for fast ray tracing.

Digital Processing Environment in Which Invention Can Be Implemented

Figure 26:
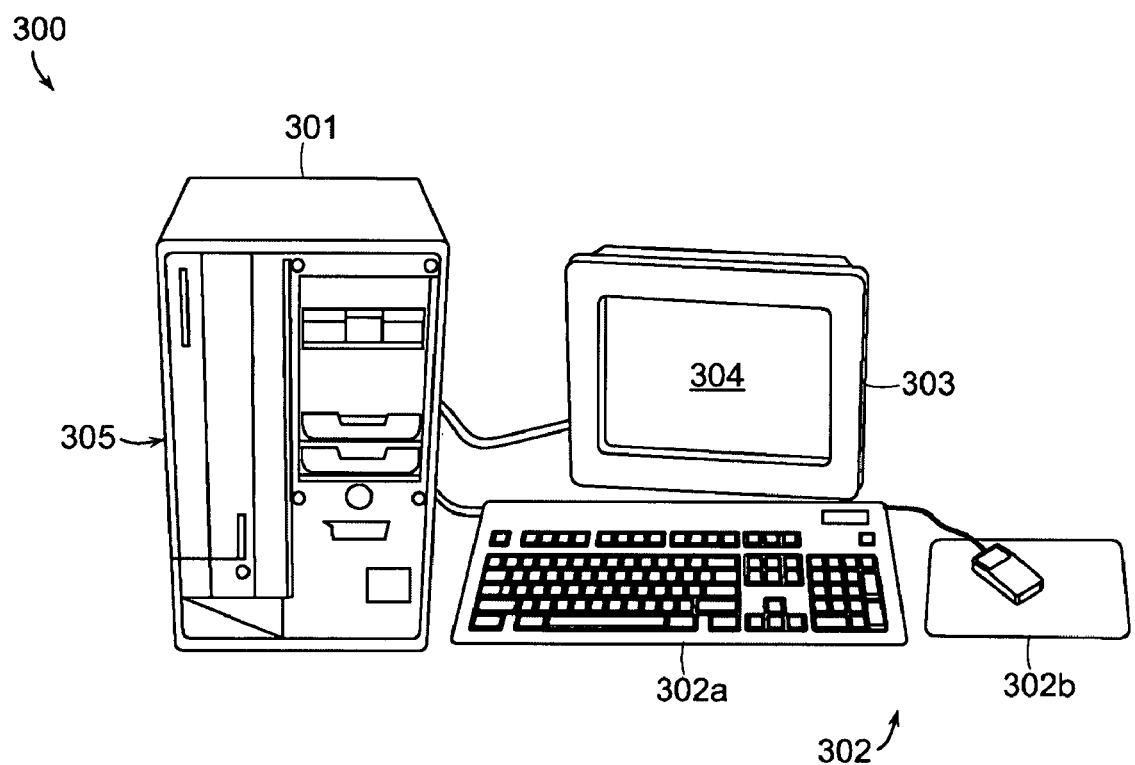
FIGS. 26, 27A and 27B are a series of schematic diagrams illustrating a suitable digital processing environment for use in practice various described aspects of the present invention.
Figure 27A:
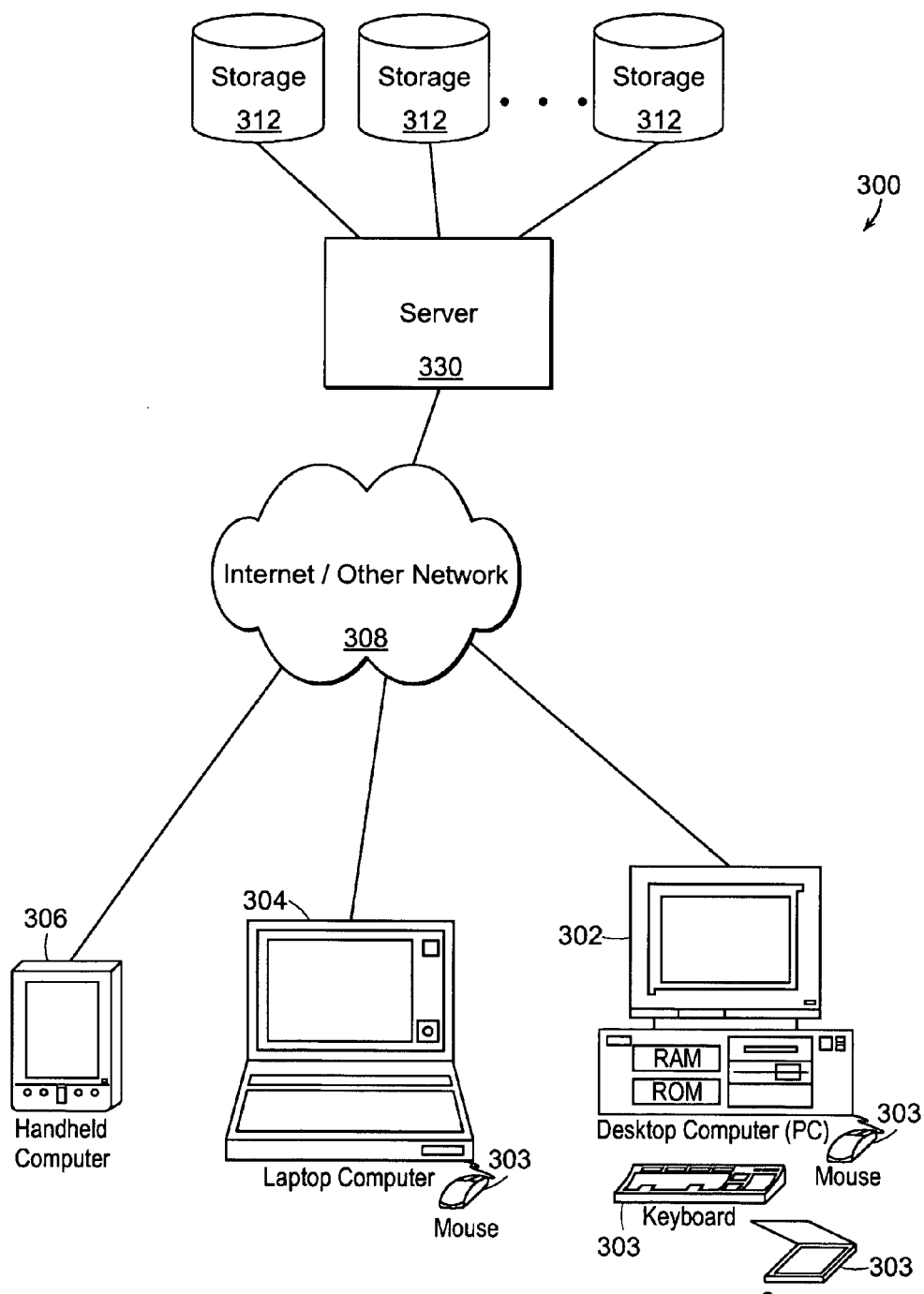
Figure 27B:
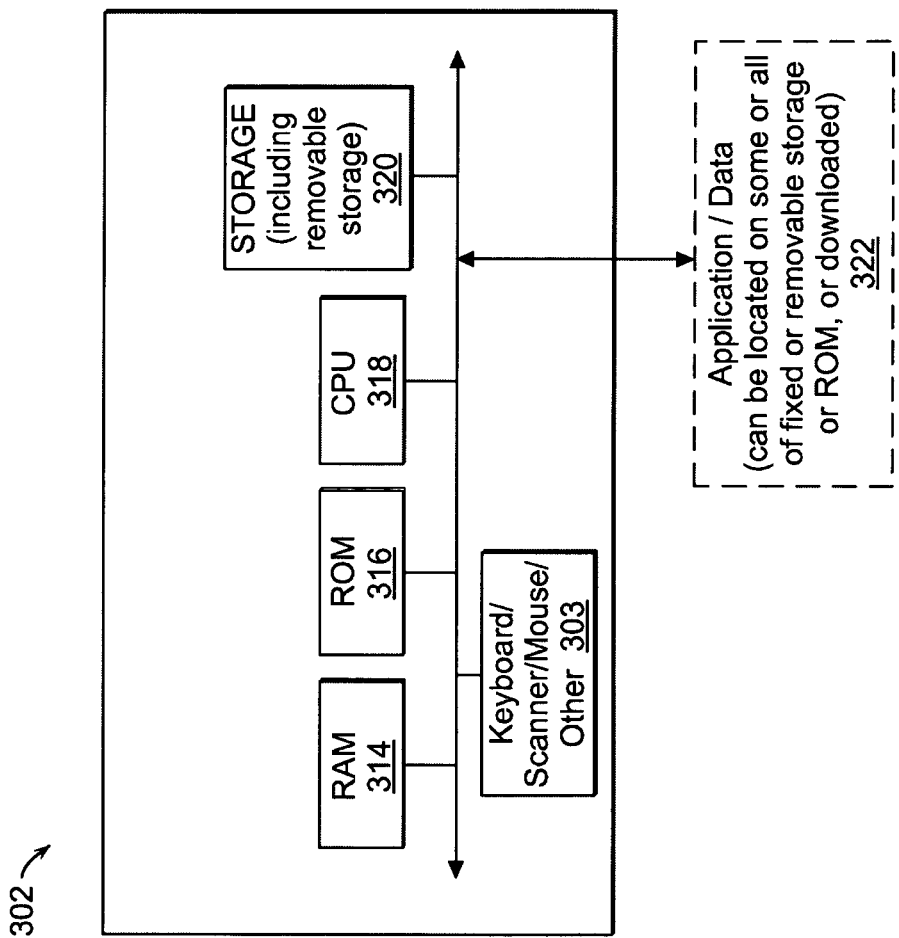

The following is a discussion, to be read in connection with FIGS. 26 and 27A-27B, of typical, relatively conventional digital processing structures and environments in which the above-described invention may be implemented and practiced.

It will be understood by those skilled in the art that the present invention, as described above, provides methods, systems, devices and computer program products that enable the creation of the appearance of rounded corners and edges and other activities in computer graphics systems, whose output is typically a human-perceptible (or digitally stored and/or transmitted) image or series of images that can comprise, for example, an animated motion picture, computer aided design representation, or other typical computer graphics output. The present invention can thus be implemented as part of the computer software or computer hardware of a computer that forms part of a computer graphics system, along with a display, user interface elements such as a keyboard, tablet and/or mouse, memory, storage, and other conventional computer graphics system components. While conventional components of such kind are well known to those skilled in the art, and thus need not be described in great detail herein, the following overview indicates how the present invention can be implemented in conjunction with such components in a computer graphics system.

More particularly, those skilled in the art will understand that the present invention can be utilized in die generation and synthesis of images, such as for display in a motion picture or other dynamic display. The techniques described herein can be practiced as part of a computer graphics system, in which a pixel value is generated for pixels in an image. The pixel value is representative of a point in a scene as recorded on an image plane of a simulated camera. The underlying computer graphics system can be configured to generate the pixel value for an image using a selected methodology, such as that of the present invention.

The previous detailed description illustrates examples of methods, structures, systems, and computer software products in accordance with these techniques. It will be understood by those skilled in the art that the described methods and systems can be implemented in software, hardware, or a combination of software and hardware, using conventional computer apparatus such as a personal computer (PC) or equivalent device operating in accordance with (or emulating) a conventional operating system such as Microsoft Windows, Linux, or Unix, either in a standalone configuration or across a network. The various processing aspects and means described herein may therefore be implemented in the software and/or hardware elements of a properly configured digital processing device or network of devices. Processing may be performed sequentially or in parallel, and may be implemented using special purpose or re-configurable hardware.

As an example, FIG. 26 attached hereto depicts an illustrative computer system 300 that can carry out such computer graphics processes. With reference to FIG. 26, the computer system 300 in one embodiment includes a processor module 301 and operator interface elements comprising operator input components such as a keyboard 302A and/or a mouse 302B (or digitizing tablet or other analogous element(s), generally identified as operator input element(s) 302) and an operator output element such as a video display device 303. The illustrative computer system 300 can be of a conventional stored-program computer architecture. The processor module 301 can include, for example, one or more processor, memory and mass storage devices, such as disk and/or tape storage elements (not separately shown), which perform processing and storage operations in connection with digital data provided thereto. The operator input element(s) 302 can be provided to permit an operator to input information for processing. The video display device 303 can be provided to display output information generated by the processor module 301 on a screen 304 to the operator, including data that die operator may input for processing, information that the operator may input to control processing, as well as information generated during processing. The processor module 301 can generate information for display by the video display device 303 using a so-called "graphical user interface" ("GUI"), in which information for various applications programs is displayed using various "windows."

The terms "memory", "storage" and "disk storage devices" can encompass any computer readable medium, such as a computer hard disk, computer floppy disk, computer-readable flash drive, computer-readable RAM or ROM element or any other known means of encoding digital information. The term "applications programs", "applications", "programs", "computer program product" or "computer software product" can encompass any computer program product consisting of computer-readable programs instructions encoded and/or stored on a computer readable medium, whether that medium is fixed or removable, permanent or erasable, or otherwise. As noted, for example, in block 322 of the schematic block diagram of FIG. 27B, applications and data can be stored on a disk, in RAM, ROM, on other removable or fixed storage, whether internal or external, and can be downloaded or uploaded, in accordance with practices and techniques well known in the art. As will also be noted in this document, the present invention can take the form of software or a computer program product stored on a computer-readable medium, or it can be in the form of computer program code that can be uploaded or downloaded, or fixed in an FPGA, ROM or other electronic structure, or it can take the form of a method or a system for carrying out such a method. In each case, the invention is operable to enable a computer or computer system to calculate a pixel value for pixels in an image or scene, and the pixel value can be used by other elements of a computer graphics system, which can be conventional elements such as graphics cards, display controllers, or display elements such as LCDs and/or CRTs, to generate a display-controlling electrical or electronic output, and ultimately to enable the display of an image in a human-perceptible form, and/or die storage of such an image (or data specifying such an image) for later display and/or processing.

Although the computer system 300 is shown as comprising particular components, such as the keyboard 302a and mouse 302b for receiving input information from an operator, and a video display device 303 for displaying output information to the operator, it will be appreciated that the computer system 300 may include a variety of components in addition to or instead of those specifically set forth herein.

In addition, the processor module 301 can include one or more network ports, generally identified by reference numeral 305, which are connected to communication links which connect the computer system 300 in a computer network. The network ports enable the computer system 300 to transmit information to, and receive information from, other computer systems and other devices in the network In a typical network organized according to, for example, the client-server paradigm, certain computer systems in die network are designated as servers, which store data and programs (generally, "information") for processing by die other, client computer systems, thereby to enable the client computer systems to conveniently share the information. A client computer system which needs access to information maintained by a particular server will enable the server to download the information to it over the network. After processing the data, the client computer system may also return the processed data to the server for storage. In addition to computer systems (including the above-described servers and clients), a network may also include, for example, printers and facsimile devices, digital audio or video storage and distribution devices, and the like, which may be shared among the various computer systems connected in the network. The communication links interconnecting die computer systems in the network may, as is conventional, comprise any convenient information-carrying medium, including wires, optical fibers or other media for carrying signals among the computer systems. Computer systems transfer information over the network by means of messages transferred over the communication links, with each message including information and an identifier identifying the device to receive the message.

In addition to the computer system 300 shown in the drawings, methods, devices or software products in accordance with the present invention can operate on any of a wide range of conventional computing devices and systems, such as those depicted by way of example in FIGS. 27A and 27B (e.g., network system 300), whether standalone, networked, portable or fixed, including conventional PCs 302, laptops 304, handheld or mobile computers 306, or across the Internet or other networks 308, which may in turn include servers 310 and storage 312.

In line with conventional computer software and hardware practice, a software application configured in accordance with the invention can operate within, e.g., a PC 302 like that shown in FIGS. 27A-27B, in which program instructions can be read from ROM or CD-ROM 316 (FIG. 27B), magnetic disk or other storage 320 and loaded into RAM 314 for execution by CPU 318. Data can be input into the system via any known device or means, including a conventional keyboard, scanner, mouse, digitizing tablet, or other elements 303. As shown in FIG. 27B, the depicted storage 320 includes removable storage. As further shown in FIG. 27B, applications and data 322 can be located on some or all of fixed or removable storage or ROM, or downloaded.

Those skilled in the art will understand that the method aspects of the invention described herein can be executed in hardware elements, such as a Field-Programmable Gate Array (FPGA) or an Application-Specific Integrated Circuit (ASIC) constructed specifically to carry out the processes described herein, using ASIC construction techniques known to ASIC manufacturers. Various forms of ASICs are available from many manufacturers, although currently available ASICs do not provide the functions described in this patent application. Such manufacturers include Intel Corporation and NVIDIA Corporation, both of Santa Clara, Calif. The actual semiconductor elements of a conventional ASIC or equivalent integrated circuit are not part of the present invention, and will not be discussed in detail herein.

Those skilled in the art will also understand that ASICs or other conventional integrated circuit or semiconductor elements can be implemented in such a manner, using the teachings of the present invention as described in greater detail herein, to carry out the methods of the present invention, as discussed herein.

Figure 28:
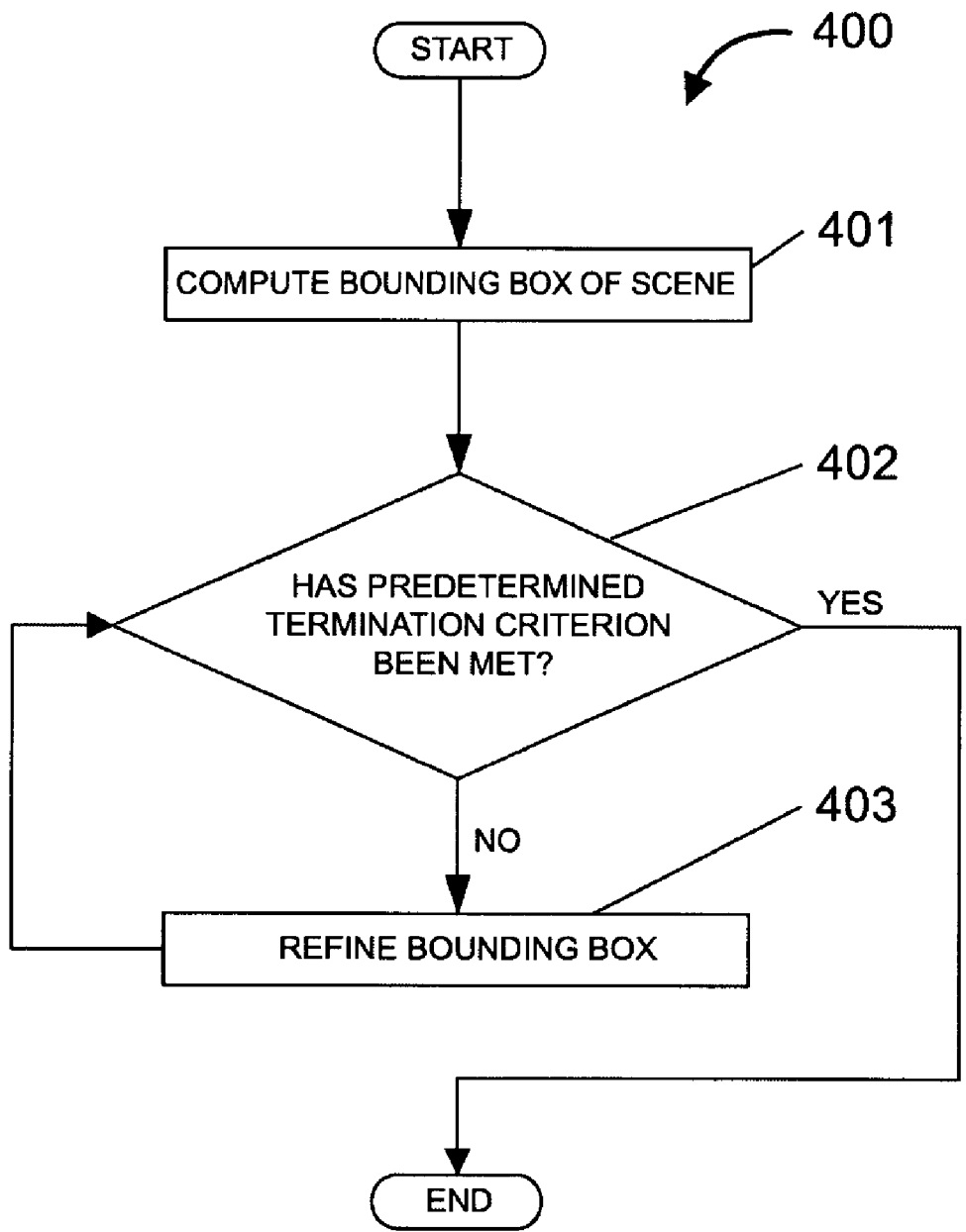
FIG. 28 is a diagram illustrating an overall method in accordance with a first aspect of the present invention.

Those skilled in the art will also understand that method aspects of the present invention can be carried out within commercially available digital processing systems, such as workstations and personal computer's (PCs), operating under the collective command of the workstation or PC's operating system and a computer program product configured in accordance with the present invention. The term "computer program product" can encompass any set of computer-readable programs instructions encoded on a computer readable medium. A computer readable medium can encompass any form of computer readable element, including, but not limited to, a computer hard disk, computer floppy disk, computer-readable flash drive, computer-readable RAM or ROM element, or any other known means of encoding, storing or providing digital information, whether local to or remote from the workstation, PC or other digital processing device or system. Various forms of computer readable elements and media are well known in the computing arts, and their selection is left to the implemented In each case, the invention is operable to enable a computer system to calculate a pixel value, and the pixel value can be used by hardware elements in the computer system, which can be conventional elements such as graphics cards or display controllers, to generate a display-controlling electronic output. Conventional graphics cards and display controllers are well known in the computing arts are not necessarily part of the present invention, and their selection can be left to the implemented Efficient Construction of Acceleration Data Structures FIG. 28 is a diagram depicting an overall method 400 in accordance with an aspect of the present invention. The method is practiced in the context of a computer graphics system, in which a pixel value is generated for each pixel in an image. Each generated pixel value is representative of a point in a scene as recorded on an image plane of a simulated camera. The computer graphics system is configured to generate the pixel value for an image using a selected ray-tracing methodology. The selected ray-tracing methodology includes the use of a ray tree that includes at least one ray shot from the pixel into a scene along a selected direction (or from the scene into the pixel), and further includes calculations of the intersections of rays and objects (and/or surfaces of objects) in die scene.

In the FIG. 28 method 400, bounding volume hierarchies are used to calculate the intersections of rays and surfaces in the scene. In step 401, a bounding box of a scene is computed. In step 402, it is determined whether a predetermined termination criterion is met. If not, then in step 403 the axis-aligned bounding box is refined. The process continues recursively until the termination criterion is met. According to an aspect of the invention, the termination criterion is defined as a condition at which the bounding box coordinates differ only in one unit of resolution from a floating point representation of the ray/surface intersection point. However, the scope of the present invention extends to other termination criteria.

The use of bounding volume hierarchies as an acceleration structure is advantageous for a number of reasons. The memory requirements for bounding volume hierarchies can be linearly bounded in die number of objects to be ray traced. Also, as described below, bounding volume hierarchies can be constructed much more efficiently than 3D-trees, which makes them very suitable for an amortized analysis, as required for fully animated scenes.

Figure 29:
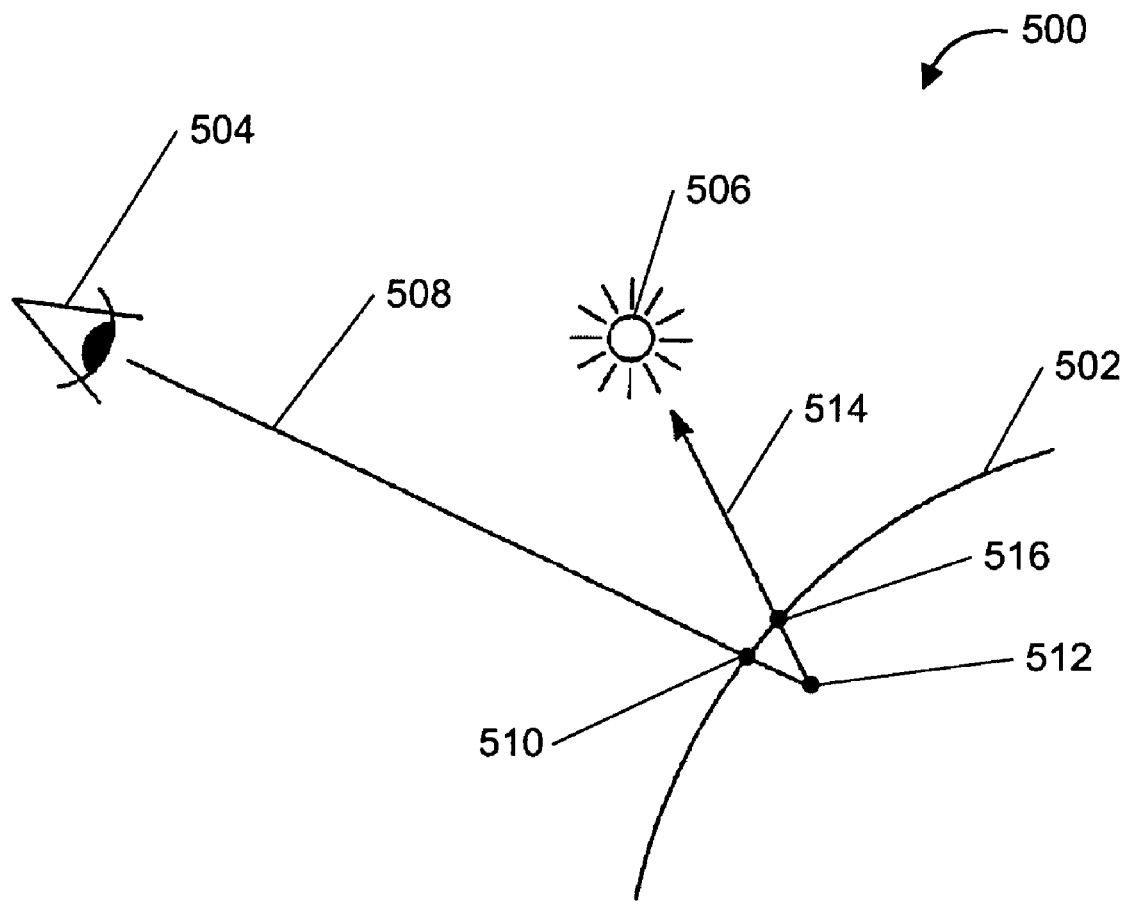
FIG. 29 is diagram of a ray tracing procedure, illustrating the problem of self-intersection.

The following discussion describes in greater detail certain issues in ray tracing technology, and particular aspects of the invention that address those issues. FIG. 29 is a diagram illustrating the "self-intersection" problem, FIG. 29 shows a ray tracing procedure 500, including an image surface 502, an observation point 504, and a light source 506. In order to synthesize an image of the surface, a series of computations are performed in order to locate rays extending between die observation point 504 and the surface 502. FIG. 29 shows one such ray 508. Ideally, there is then calculated the exact point of intersection 510 between the ray 508 and the surface 502.

However, due to floating point arithmetic computations on computers, it is sometimes possible for the calculated ray/surface intersection point 512 to be different from the actual intersection point 510. Further, as illustrated in FIG. 29, it is possible for the calculated point 512 to be located on the "wrong" side of the surface 502. In that case, when computations are performed to locate a secondary ray 514 extending from the calculated ray/surface intersection point 512 to the light source 506, these computations indicate that the secondary ray 514 hits the surface 502 at a second intersection point 516 rather than extending directly to the light source 506, thus resulting in an imaging error.

One known solution to the self-intersection problem is to start each ray 508 at a safe distance from the surface 502. This safe distance is typically expressed as a global floating point $\epsilon$. However, the determination of die global floating point $\epsilon$ depends heavily on the scene, and the particular location within the scene itself, for which an image is being synthesized.

An aspect of the invention provides a more precise alternative. After arriving at a calculated ray/surface intersection point 512, the calculated point 512 and the direction of the ray 508 are then used to re-compute an intersection point that is closer to the actual intersection point 510. This re-computation of the intersection point is incorporated into the ray tracing technique as an iteration that increases precision. If the iteratively computed intersection point turns out to be on the "wrong" side of die surface 502, it is moved to the "correct" side of the surface 502. The iteratively computed intersection point can be moved along the surface normal, or along the axis determined by the longest component of the normal. Instead of using a global floating point $\epsilon$, the point is moved by an integer $\epsilon$ to the last bits of the floating point mantissas.

The described procedure avoids computations in double precision and has the advantage that it implicitly adapts to the scale of the floating point number, which is determined by its exponent. Thus, in this implementation, all secondary rays directly start from these modified points making an $\epsilon$-offset unnecessary. During intersection computation, it can therefore be assumed that the ray interval of validity to begin at 0 rather than some offset (excluding 0 from the interval, as explained hereinbelow).

Modifying the integer representation of the mantissa also avoids numerical problems when intersecting a triangle and a plane in order to decide which points are on what side.

Exploiting the convex hull property of convex combinations, intersections of rays and freeform surfaces can be found by refining an axis-aligned bounding box, which contains the point of intersection nearest to the ray origin. This refinement can be continued until the resolution of floating point numbers is reached, i.e., until the bounding box coordinates differ only in one unit of resolution from the floating point representation. The self-intersection problem then is avoided by selecting the bounding box corner that is closest to the surface normal in the center of the bounding box. This corner point then is used to start the secondary ray. This "ray object intersection test" is very efficient and benefits from the avoidance of the self-intersection problem.

After constructing the acceleration data structure, the triangles are transformed in-place. The new representation encodes degenerate triangles so that the intersection test can handle them without extra effort. It of course is also possible to just prevent degenerate triangles to enter the graphics pipeline.

The test first determines the intersection of the ray and die plane of die triangle and then excludes intersections outside the valid interval ]0, result.tfar] on the ray. This is achieved by only one integer test. Note that the +0 is excluded from the valid interval. This is important if denormalized floating point numbers are not supported. If this first determination is successful, die test proceeds by computing the Bars centric coordinates of the intersection. Note that again only an integer test, i.e., more specifically only testing two bits, is required to perform the complete inclusion test. Thus the number of branches is minimal. In order to enable this efficient test, the edges and the normal of the triangle are scaled appropriately in the transformation step.

The precision of the test is sufficient to avoid wrong or missed ray intersections. However, during traversal situations may occur in which it is appropriate to extend the triangles for a robust intersection test. This can be done before transforming the triangles. Since the triangles are projected along the axis identified by the longest component of their normal, this projection case has to be stored. This is achieved by counters in the leaf nodes of the acceleration data structure: The triangle references are sorted by the projection case and a leaf contains a byte for the number of triangles in each class.

A further aspect of the present invention provides an improved approach for constructing acceleration data structures for ray tracing. Compared with prior software implementations that follow a number of different optimizations, the approach described herein yields significantly flatter trees with superior ray tracing performance.

Candidates for splitting planes are given by the coordinates of the triangle vertices inside the axis-aligned bounding box to be partitioned. Note that this includes vertices that actually lie outside the bounding box, but have at least one coordinate that lies in one of the three intervals defined by the bounding box. Out of these candidates, there is selected the plane closest to middle of the longest side of the current axis-aligned bounding box. A further optimization selects only coordinates of triangles whose longest component of the surface normal matches the normal of the potential splitting plane. This procedure yields much flatter trees, since placing splitting planes through the triangle vertices implicitly reduces the number of triangles split by splitting planes. In addition, the surface is approximated tightly and empty space is maximized. If the number of triangles is higher than a specified threshold and there are no more candidates for splitting planes, the box is split in the middle along its longest side. This avoids inefficiencies of other approaches, including the use, for example, of long diagonal objects.

The recursive procedure of deciding which triangles belong to the left and right child of a node in the hierarchy has typically required extensive bookkeeping and memory allocation. There is a much simpler approach that only fails in exceptional cases. Only two arrays of references to the objects to be ray traced are allocated. The first array is initialized with the object references. During recursive space partition, a stack of the elements on the left is grown from the beginning of the array, while the elements, which are classified right, are kept on a stack growing from the end of the array towards the middle. In order to be able to quickly restore the elements that are intersecting a split plane, i.e., are both left and right, the second array keeps a stack of them. Thus backtracking is efficient and simple.

Instead of pruning branches of the tree by using the surface area heuristic, tree depth is pruned by approximately leftbalancing the binary space partition starting from a fixed depth. As observed by exhaustive experimentation, a global fixed depth parameter can be specified across a vast variety of scenes. This can be understood by observing that after a certain amount of binary space partitions usually there remain connected components that are relatively flat in space.

Using bounding volume hierarchies, each object to be ray traced is referenced exactly once. As a consequence, and in contrast with 3D-trees, no mailbox mechanisms are required to prevent the multiple intersection of an object with a ray during the traversal of the hierarchy. This is a significant advantage from the viewpoint of system performance and makes implementations on a shared memory system much simpler. A second important consequence is that there cannot be more inner nodes in the tree of a bounding volume hierarchy than the total number of objects to be ray-traced. Thus the memory footprint of die acceleration data structure can be linearly bounded in the number of objects before construction. Such an a priori bound is not available for the construction of a 3D-tree, where the memory complexity is expected to increase quadratically with the number of objects to be ray-traced.

Thus, there is now described a new concept of bounding volume hierarchies that are significantly faster than current 3D-tree ray tracing techniques, and in which the memory requirements grow linearly, rather than expected quadratically, with the number of objects to be ray-traced. The core concept that allows bounding volume hierarchies to outperform 3D-trees is to focus on how space can be partitioned, rather than focusing on the bounding volumes themselves.

Figure 30:
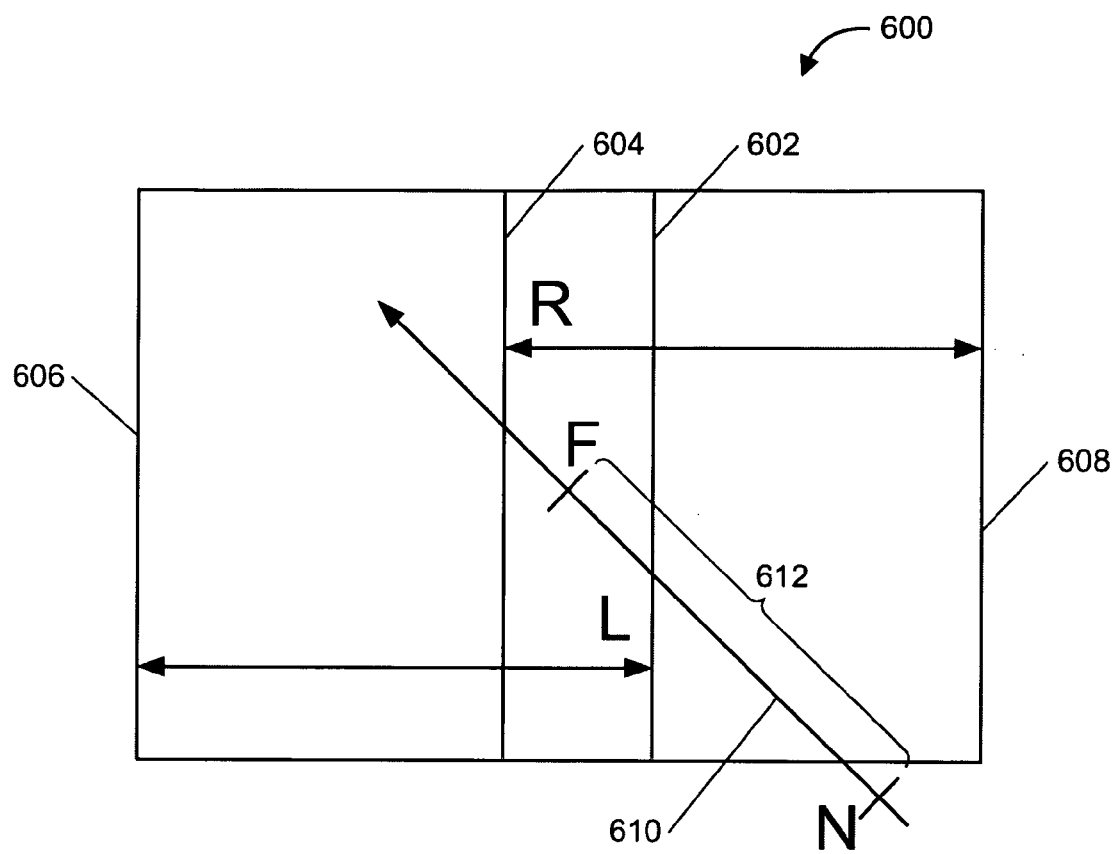
FIG. 30 shows a diagram, in elevation view, of a partitioned axis-aligned bounding box that is used as an acceleration data structure in accordance with a further aspect of the invention.

In a 3D-tree, a bounding box is partitioned by a single plane. According to the present aspect of the invention, two parallel planes are used to define two axis-aligned bounding boxes. FIG. 30 is a diagram illustrating the principal data structure 400.

FIG. 30 shows an axis-aligned bounding box 600, in elevation view. An L-plane 602 and an R-plane 604, which are axis-aligned and parallel with each other, are used to partition bounding box 600 into left and right axis-aligned bounding box. The left bounding box extends from the left wall 606 of the original bounding box 600 to the L-plane 602. The right bounding box extends from the R-plane 604 to the right wall 608 of the original bounding box 402. Thus, the left and right bounding boxes may overlap each other. The traversal of ray 610 is determined by the positions of intersection with the L- and R-planes 602 and 604 relative to the interval of validity [T, F] 612 of the ray 610.

In the FIG. 30 data structure, the L- and R-planes 602 and 604 are positioned with respect to each other to partition the set of objects contained within the original bounding box 600, rather than the space contained within the bounding box 600. In contrast with a 3D-tree partition, having two planes offers the possibility of maximizing the empty space between the two planes. Consequently the boundary of the scene can be approximated much faster.

Figure 31:
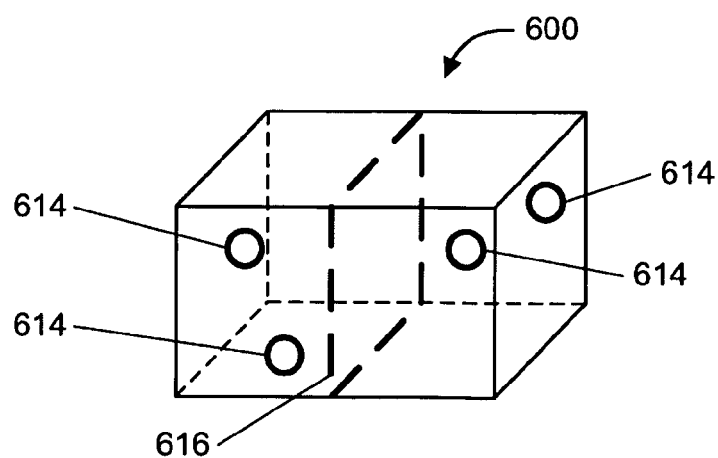

FIGS. 31-33 are a series of three-dimensional diagrams further illustrating data structure. FIG. 31 shows a diagram of bounding box 600. For purposes of illustration, virtual objects within bounding box 600 are depicted as abstract circles 614. As shown in FIGS. 32 and 33, L-plane 602 and R-plane 604 are then used to partition bounding box 600 into a left bounding box 600a and a right bounding box 600b. The L- and R-planes are selected such that the empty space between them is maximized. Each virtual object 614 ends up in either the left bounding box 600a or the right bounding box 600b. As shown at the bottom of FIG. 33, the virtual objects 614 are partitioned into "left" objects 614a and "right" objects 614b. Each of the resulting bounding boxes 600a and 600b are themselves partitioned, and so on, until a termination criterion has been satisfied.

Figure 34:
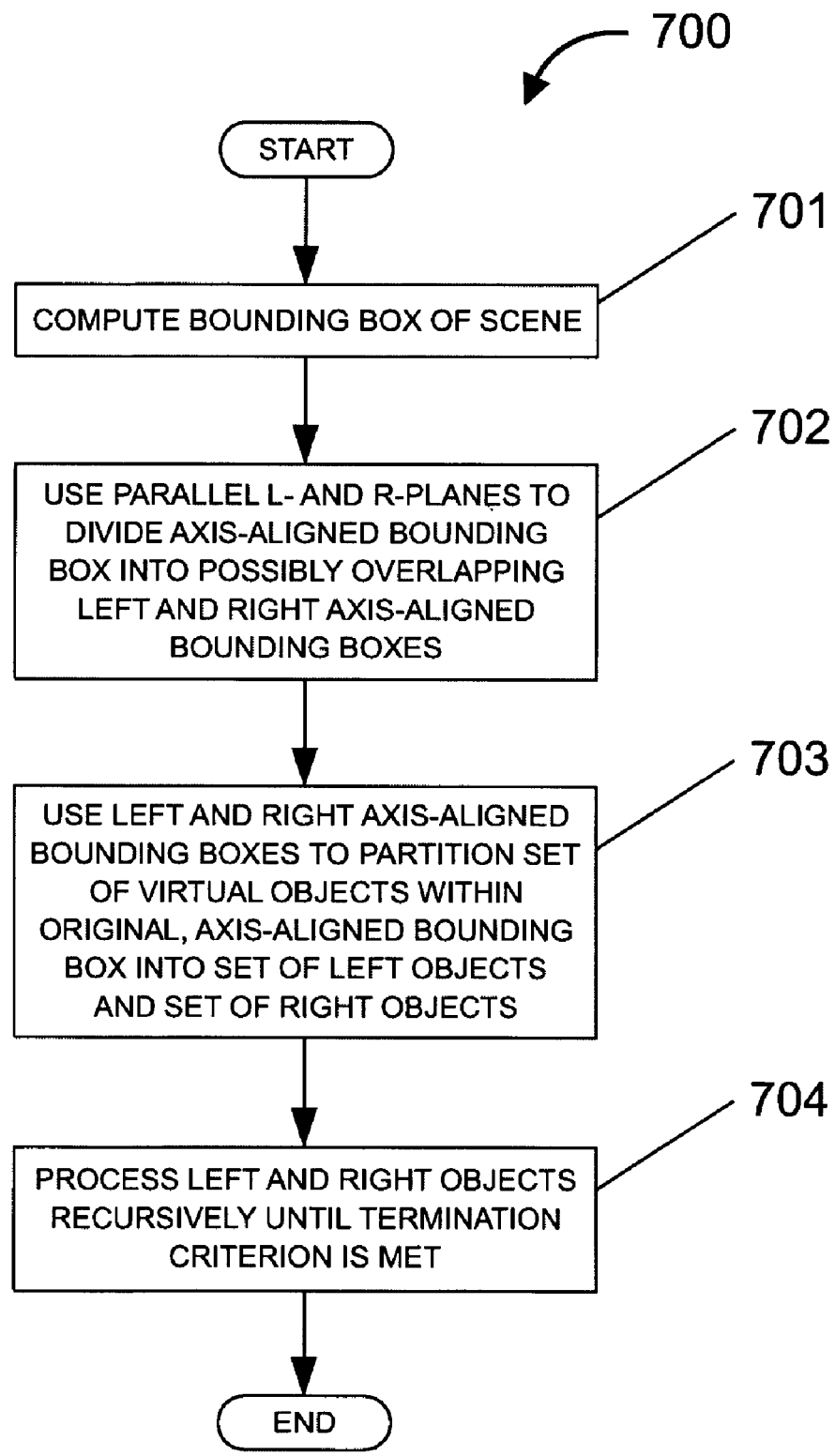
FIGS. 34 and 35 are flowcharts of ray tracing methods providing efficient construction of data acceleration structures.

FIG. 34 is a flowchart of the described method 700. In step 701, a bounding box of a scene is computed. In step 702, parallel L- and R-planes are used to partition the axis-aligned bounding box left and right axis-aligned bounding boxes, which may overlap. In step 703, the left and right bounding boxes are used to partition the set of virtual objects contained with the original axis-aligned bounding box into a set of left objects and a set of right objects. In step 704, the left and right objects are processed recursively until a termination criterion is met.

Instead of one split parameter, used in earlier implementations, two split parameters are stored within a node. Since the number of nodes is linearly bounded by the number of objects to be ray traced, an array of all nodes can be allocated once. Thus, the costly memory management of 3D-trees during construction becomes unnecessary.

The construction technique is much simpler than the analog for 3D-tree construction and is easily implemented in a recursive way, or by using an iterative version and a stack. Given a list of objects and an axis-aligned bounding box, the L- and R-planes are determined, and the set of objects is determined accordingly. The left and right objects are then processed recursively until some termination criterion is met. Since the number of inner nodes is bounded, it is safe to rely on termination when there is only one object left.

It should be noted that the partition only relies on sorting objects along planes that are perpendicular to the x-, y-, and z-axes, which is very efficient and numerically absolutely stable. In contrast with 3D-trees, no exact intersections of objects with splitting planes need to be computed, which is more costly and hard to achieve in a numerically robust way. Numerical problems of 3D-trees, such as missed triangles at vertices and along edges, can be avoided by extending the triangles before the construction of the bounding volume hierarchy. Also, in a 3D-tree, overlapping objects have to be sorted both into the left and right axis-aligned bounding boxes, thereby causing an expected quadratic growth of the tree.

Various techniques may be used to determine die L- and R-planes, and thus the actual tree layout. Returning to FIGS. 31-33, one technique is to determine a plane M616 using the 3D-tree construction technique described above and partition the objects such that the overlap of the resulting L-plane and R-plane of the new axis-aligned bounding boxes minimally overlaps die suggested splitting plane M616. The resulting tree is very similar to die corresponding 3D-tree, however, since the object sets are partitioned rather than space, the resulting tree is much flatter. Another approach is to select the R-plane and L-plane in such a way that the overlap of child boxes is minimal and the empty space is maximized if possible. It should be noted that for some objects axis-aligned bounding boxes are inefficient. An example of such a situation is a long cylinder with small radius on the diagonal of an axis-aligned bounding box.

Figure 35:
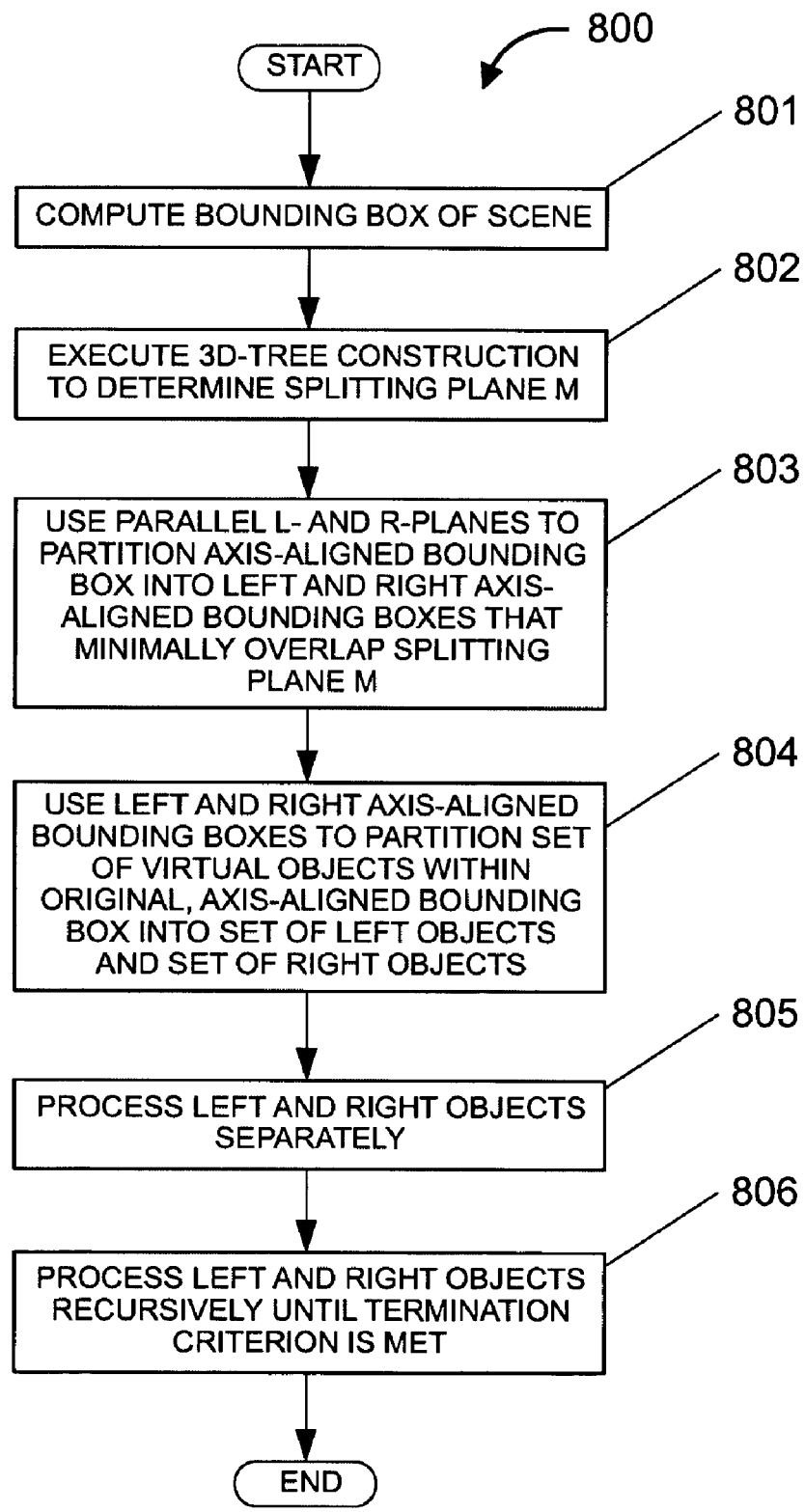

FIG. 35 is a flowchart of a method 800 according to this aspect of the invention. In step 801, a bounding box of a scene is computed. In step 802, a 3D-tree construction is executed to determine a splitting plane M. In step 803, parallel L- and R-planes are used to partition the axis-aligned bounding box into left and right axis-aligned bounding boxes that minimally overlap the splitting plane M. In step 804, the left and right bounding boxes are used to partition the set of virtual objects contained within the original axis-aligned bounding box into a set of left objects and a set of right objects. In step

805, the left and right objects are processed recursively until a termination criterion is met. It should be noted that the method 800 illustrated in FIG. 35, as well as the method 400 illustrated in FIG. 28, may be combined with other techniques described herein, including techniques relating to 3D-tree construction, real-time processing, bucket sorting, self-intersection, and the like.

In the case of the 3D-tree, the spatial subdivision is continued so as to cut off the empty portions of the space around the object. In the case of the described bounding volume hierarchy, partitioning such objects into smaller ones results in a similar behavior. In order to maintain the predictability of the memory requirements, a maximum bounding box size is defined. All objects with an extent that exceeds the maximum bounding box size are split into smaller portions to meet the requirement. The maximum allowed size can be found by scanning the data set for the minimal extent among all objects.

The data structure described herein allows the transfer of the principles of fast 3D-tree traversal to bounding volume hierarchies. The cases of traversal are similar: (1) only the left child; (2) only the right child; (3) the left child and then the right child; (4) the right child and then the left child: or (5) die ray is between split planes (i.e., empty space). Since one node in the described technique is split by two parallel planes, the order of how to traverse the boxes is determined by the ray direction.

Previous bounding volume hierarchy techniques could not efficiently determine the order of how to traverse the child nodes or required additional effort, such as updating a heap data structure. In addition a whole bounding volume had to be loaded and tested against the ray, while the present approach only requires the two plane distances. Checking the ray against the two planes in software seems to be more expensive, however. The traversal is the bottle neck in 3D-trees, and doing some more computation here better hides the latencies of memory access. In addition, the bounding volume hierarchy trees tend to be much smaller than corresponding 3D-trees of same performance.

Although there is herein described a new bounding volume hierarchy, there is a strong link to traversing 3D-trees: Setting L=R, the classical binary space partition is obtained, and the traversal algorithm collapses to die traversal algorithm for 3D-trees.

The described bounding volume hierarchy also can be applied to efficiently find ray freeform surface intersections by subdividing die freeform surface. Doing so allows the intersection of a freeform surface with a convex hull property and a subdivision algorithm efficiently to be computed up to floating point precision, depending on the actual floating point arithmetic. A subdivision step is performed, for example, for polynomial surfaces, rational surfaces, and approximating subdivision surfaces. For each axis in space the possibly overlapping bounding boxes are determined as discussed above. In case of a binary subdivision, die intersection of the L-boxes and the intersection of the R-boxes for new bounding boxes of the new meshes. Now the above-described traversal can be efficiently performed, since the spatial order of the boxes is known. Instead of pre-computing the hierarchy of bounding volumes, it can be computed on the fly. This procedure is efficient for freeform surfaces and allows one to save the memory for the acceleration data structure, which is replaced by a small stack of the bounding volumes that have to be traversed by backtracking. The subdivision is continued until the ray surface intersection lies in a bounding volume that collapsed to a point in floating point precision or an interval of a small size.

Using regular grids as an acceleration data structure in ray tracing is simple, but efficiency suffers from a lack of spatial adaptivity and the subsequent traversal of many empty grid cells. Hierarchical regular grids can improve on the situation, but still are inferior as compared to bounding volume hierarchies and 3D-trees. However, regular grids can be used to improve on the construction speed of acceleration data structures. The technique for constructing the acceleration data structures are similar to quick sorting and are expected to run in O(n log n). An improvement can be obtained by applying bucket sorting, which runs in linear time. Therefore the axis-aligned bounding box of the objects is partitioned into $n_x \times n_y \times n_z$ axis-aligned boxes. Each object then is sorted into exactly one of these boxes by one selected point, e.g., the center of gravity or the first vertex of each triangle could be used. Then the actual axis-aligned bounding box of the objects in each grid cell is determined. These axis-aligned bounding boxes are used instead of the objects they contain as long as the box does not intersect one of the division planes. In that case die box is unpacked and instead the objects in the box will be used directly. This procedure saves a lot of comparisons and memory accesses, noticeably improves the constant of die order of die construction techniques, and also can be applied recursively. The above technique is especially appealing to hardware implementations, since it can be realized by processing a stream of Objects.

The acceleration data structures can be built on demand, i.e., at the time when a ray is traversing a specific axis-aligned bounding box with its objects. Then on the one hand the acceleration data structure never becomes refined in regions of space, which are invisible to the rays, and caches are not polluted by data that is never touched. On the other hand after refinement the objects possibly intersected by a ray are already in the caches.

From die above discussion, it will be seen that the present invention addresses long known issues in ray tracing and provides techniques for ray tracing having improved precision, overall speed and memory footprint of the acceleration data structures. The improvements in numerical precision transfer to other number systems as well as, for example, to the logarithmic number system used in die hardware of the ART ray tracing chips. It is noted that the specific implementation of the IEEE floating point standard on a processor or a dedicated hardware can severely influence performance. For example, on a Pentium 4 chip denormalized numbers can degrade performance by a factor of 100 and more. As discussed above, an implementation of the invention avoids these exceptions. The view of bounding volume hierarchies described herein makes diem suited for realtime ray tracing. In an amortized analysis, the described techniques outperform the previous state of the art, thus allowing more precise techniques to be used, for example, for computing motion blur in fully animated scene, as in a production setting or the like. It will be apparent from the above discussion that the described bounding volume hierarchies have significant advantages when compared with 3D-trees and other techniques, particularly in hardware implementations and for huge scenes. In an amortized analysis, the described bounding volume hierarchies outperform current 3D-trees by at least a factor of two. In addition, the memory footprint can be determined beforehand and is linear in the number of objects.

5. Overall System and Technique

FIG. 36 is a diagram of an exemplary processing system 1000 including a plurality of processing modules 1001-1005 in accordance with various aspects of the invention described above:

Module 1001: Module to subdivide (e.g., tessellate) geometry or bounding boxes in a numerically robust way.

Module 1002: Module to build "classic" acceleration data structure for ray tracing from previous module 1001.

Module 1003: Module to optionally/potentially use precompiled parts of a hierarchy to speed up the process for animated geometry.

Module 1004: Module to increase arity of data structure by merging subsequent levels of the hierarchy.

Module 1005: Module to traverse nodes using SIMD instructions for either rays or packets of rays.

Figure 37:
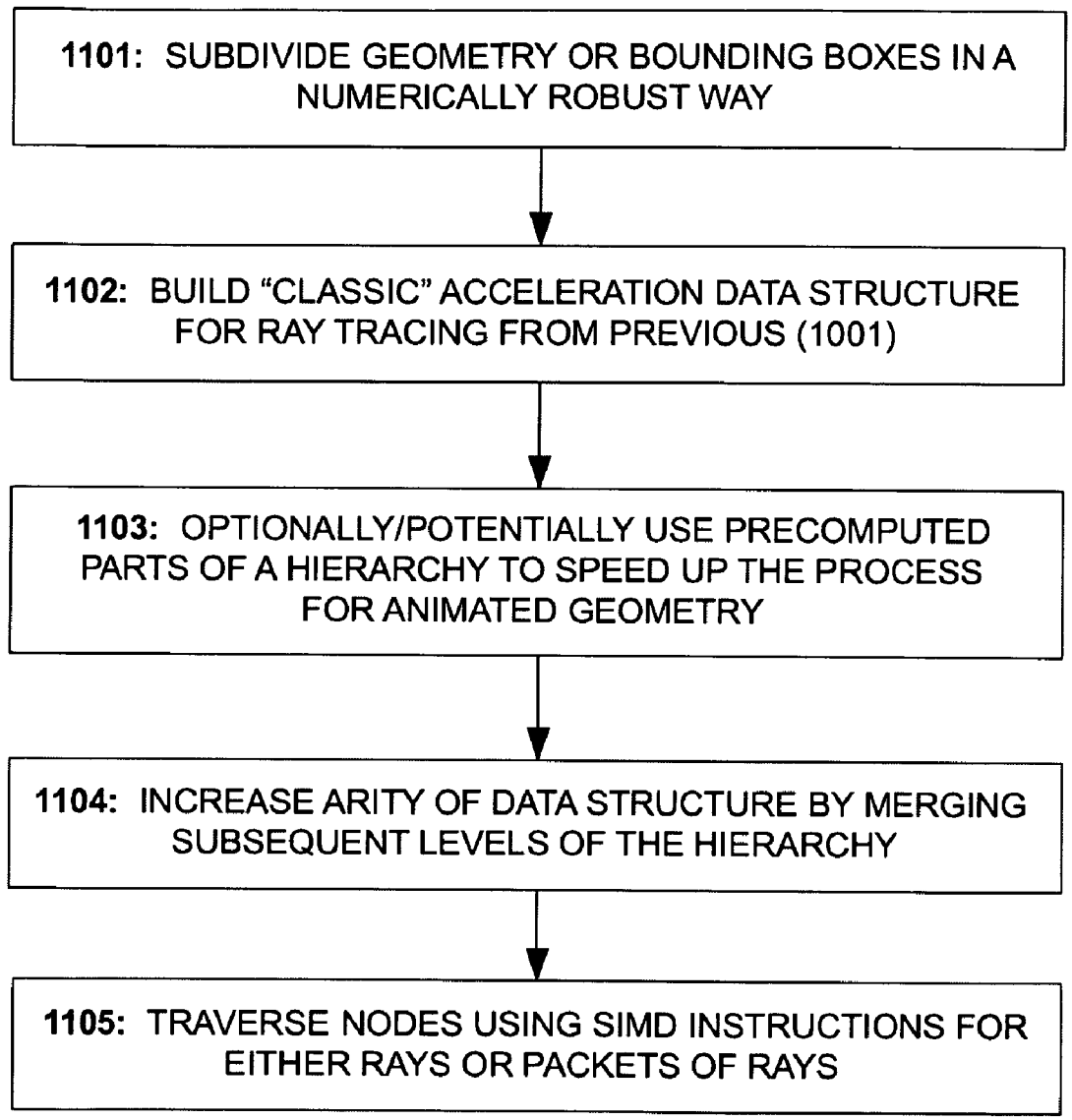
FIG. 37 is a flowchart of a general technique according to various described aspects of the invention.

FIG. 37 is a flowchart of an exemplary general technique 1100 according to various aspects of the invention described above:

Box 1101: Subdivide (e.g., tessellate) geometry or bounding boxes in a numerically robust way.

Box 1102: Build "classic" acceleration data structure for ray tracing from previous box 1101.

Box 1103: Optionally/potentially use precomputed parts of a hierarchy to speed up the process for animated geometry.

Box 1104: Increase arity of data structure by merging subsequent levels of the hierarchy.

Box 1105: Traverse nodes using SIMD instructions for either rays or packets of rays.

It should be noted that FIGS. 36 and 37 are intended to be exemplar, rather than limiting. The present invention may be practiced in a number of different ways, using different combinations of some or all of die elements set forth in these drawings, as well as combinations including elements not explicitly set forth in these drawings.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. A method, executable in a computer graphics system comprising a computer and a display element, the display element being operable to display a human-perceptible image in response to a display-controlling electrical output from the computer, the computer being operable to generate the display-controlling electrical output based on calculations of pixel values for pixels in the image, respective pixel values being representative of at least one point in a scene as recorded on an image plane of a simulated camera, the computer being operable to generate pixel values for an image using a ray-tracing methodology, the ray-tracing methodology comprising the simulating of at least one ray shot from the pixel into a scene, or from the scene to a pixel, along a selected direction, the ray-tracing methodology further comprising the calculating of the intersections of rays and surfaces of objects in the scene and the simulating of trajectories of rays illuminating objects in the scene, the method comprising:

employing shallow bounding volume hierarchies (BVH) to enable rapid tracing of incoherent rays using streaming SIMD (Single Instruction, Multiple Data) instructions; and accelerating ray tracing by using acceleration data structures with high arity to enable processing of nodes using streaming SIMD instructions with reduced memory requirements, wherein high arity data structures are generated by merging levels of the bounding volume hierarchies;

the merging of levels comprising tree construction by flattening a binary tree, wherein flattening a binary tree comprises collapsing a binary tree by keeping each k-th level of a given tree, and discarding intermediate levels;

wherein the SIMD instructions are used in construction of bounding volume hierarchies, tree traversal and leaf intersection;

wherein the use of streaming SIMD instructions is enabled by increasing the arity of acceleration structures; and further comprising:

utilizing caching to accelerate processing of shadow rays in a global illumination process without increasing memory requirements;

utilizing per-ray ordered, sorted traversal; and applying streaming SIMD instruction processing to leaf intersection, using a cache storing image-related triangles in SIMD-compatible form.

2. The method of claim 1 wherein the SIMD-compatible form comprises a compressed representation of triangles.

3. The method of claim 2 wherein the SIMD-compatible form comprises a vertex-index representation of triangles.

4. The method of claim 3 further comprising sorting an additional index array.

5. The method of claim 1 further comprising utilizing a selected stack-based tree traversal technique.

6. The method of claim 1 further comprising utilizing any of triangle intersection processing, SIMD caching and a compressed representation of triangles.

7. The method of claim 6 wherein the compressed representation of triangles comprises a vertex-index data structure.

8. The method of claim 1 further comprising techniques for accelerating processing of shadow rays for point-light-based global illumination.

9. The method of claim 8 wherein the techniques for accelerating processing of shadow rays comprise any of: quitting traversal on first intersection found, omitting sorting of nodes pushed on the stack, not computing intersection distances, and starting traversal deeper in the tree instead of from a root node.

10. The method of claim 8 wherein the techniques for accelerating processing of shadow rays further comprise utilizing a backtracking technique that enables a plurality of nodes of the tree to be used as an entry point that yields correct results.

11. The method of claim 1 further comprising executing a numerically robust triangle subdivision technique that subdivides triangles only when required, and wherein a degree of subdivision is automatically selected.

12. The method of claim 11 wherein the triangle subdivision technique comprises an edge volume technique that evaluates the tightness of the bounding box of each triangle edge and subdivides the triangle until a selected threshold value is met.

13. The methods of claim 12 wherein the edge volume technique further comprises determining, for each edge of a given triangle, its axis-aligned bounding box.

14. The method of claim 13 wherein the edge volume technique further comprises comparing, for a given triangle, the volume of the largest of the three boxes to a volume threshold, and if the volume is larger than the threshold, subdividing the triangle in the middle of the corresponding edge, and repeating the procedure for the two new triangles until the process is complete.

15. The method of claim 14 wherein the edge volume threshold is determined as a fraction of the volume of the scene bounding box, thus controlling the number of triangles generated by subdivision.

16. The method of claim 15 wherein the procedure can be applied either as a pre-process before ray tracing, or for on-demand subdivision during ray tracing.

17. The method of claim 15 further comprising reducing overlap of bounding volumes of geometry of a scene.

18. The method of claim 17 wherein reducing overlap comprises caching hierarchies for selected small portions of image components.

19. The method of claim 1 wherein the procedure can be applied either as a pre-process before ray tracing, or for on-demand subdivision during ray tracing.

20. The method of claim 1 wherein for volume elements of a defined size, independent of object size, acceleration data structures are cached, and may be employed to construct a top-level acceleration data structure.

21. The method of claim 1 further comprising applying the technique of employing shallow BVH and using streaming SIMD instructions to at least one spatial partitioning scheme.

22. The method of claim 21 wherein the spatial partitioning scheme comprises any of k-d trees and BSP-trees.

23. The method of claim 1 further comprising applying streaming SIMD instructions to at least one object list partitioning scheme.

24. The method of claim 23 wherein the object list partitioning scheme comprises bounding volume hierarchies.

25. The method claim 1 further comprising executing at least one operation that traces packets of rays.

26. The method of claim 1 further comprising processing a non-axis aligned geometry using a partitioning heuristic.

27. The method of claim 26 wherein the partitioning heuristic can be applied in any tessellation in order to provide crack free tessellation.

28. A computer graphics system comprising a computer and a display element, the display element being operable to display a human-perceptible image in response to a display-controlling electrical output from the computer, the computer being operable to generate the display-controlling electrical output based on calculations of pixel values for pixels in the image, respective pixel values being representative of at least one point in a scene as recorded on an image plane of a simulated camera, the computer being operable to generate pixel values for an image using a ray-tracing methodology, the ray-tracing methodology comprising the simulating of at least one ray shot from the pixel into a scene, or from the scene to a pixel, along a selected direction, the ray-tracing methodology further comprising the calculating of the intersections of rays and surfaces of objects in the scene and the simulating of trajectories of rays illuminating objects in the scene, the computer graphics system further comprising:
  means for employing shallow bounding volume hierarchies (BVH) to enable rapid tracing of incoherent rays using streaming SIMD (Single Instruction, Multiple Data) instructions; and
  means for accelerating ray tracing by using acceleration data structures with high arity to enable processing of nodes using streaming SIMD instructions with reduced memory requirements; wherein high arity data structures are generated by merging levels of the bounding volume hierarchies;
  the merging of levels comprising tree construction by flattening a binary tree, wherein flattening a binary tree comprises collapsing a binary tree by keeping each k-th level of a given tree, and discarding intermediate levels;
  wherein the SIMD instructions are used in construction of bounding volume hierarchies, tree traversal and leaf intersection;
  wherein the use of streaming SIMD instructions is enabled by increasing the arity of acceleration structures; and further comprising:
  means for utilizing caching to accelerate processing of shadow rays in a global illumination process without increasing memory requirements;
  means for utilizing per-ray ordered, sorted traversal; and
  means for applying streaming SIMD instruction processing to leaf intersection, using a cache storing image-related triangles in SIMD-compatible form.

29. A computer program code product comprising computer-readable program code stored on a non-transitory computer-readable medium, operable for execution in a computer graphics system comprising a computer and a display element, the display element being operable to display a human-perceptible image in response to a display-controlling electrical output from the computer, the computer being operable to generate the display-controlling electrical output based on calculations of pixel values for pixels in the image, respective pixel values being representative of at least one point in a scene as recorded on an image plane of a simulated camera, the computer being operable to generate pixel values for an image using a ray-tracing methodology, the ray-tracing methodology comprising the simulating of at least one ray shot from the pixel into a scene, or from the scene to a pixel, along a selected direction, the ray-tracing methodology further comprising the calculating of the intersections of rays and surfaces of objects in the scene and the simulating of trajectories of rays illuminating objects in the scene, the computer program code product further comprising:
  first computer program code means, stored on the non-transitory, computer-readable medium and executable by the computer to enable the computer to employ shallow bounding volume hierarchies (BVH) to enable rapid tracing of incoherent rays using streaming SIMD (Single instruction, Multiple Data) instructions;
  second computer program code means, stored on the non-transitory computer-readable medium and executable by the computer to enable the computer to accelerate ray tracing by using acceleration data structures with high arity to enable processing of nodes using streaming SIMD instructions with reduced memory requirements, wherein high arity data structures are generated by merging levels of the bounding volume hierarchies;
  the merging of levels comprising tree construction by flattening a binary tree, wherein flattening a binary tree comprises collapsing a binary tree by keeping each k-th level of a given tree, and discarding intermediate levels;
  wherein the SIMD instructions are used in construction of bounding volume hierarchies, tree traversal and leaf intersection;

wherein the use of streaming SIMD instructions is enabled by increasing the arity of acceleration structures; and further comprising:

third computer program code means, stored on the non-transitory computer-readable medium and executable by the computer to enable the computer to utilize caching to accelerate processing of shadow rays in a global illumination process without increasing memory requirements;

fourth computer program code means, stored on the non-transitory computer-readable medium and executable by the computer to enable the computer to utilize per-ray ordered, sorted traversal, and fifth computer program code means, stored on the non-transitory computer-readable medium and executable by the computer to enable the computer to apply streaming SIMD instruction processing to leaf intersection, using a cache storing image-related triangles in SIMD-compatible form.

* * * * *